United States Patent
Rowe

(10) Patent No.: US 9,260,305 B2
(45) Date of Patent: *Feb. 16, 2016

(54) STABLE COMPLEXES OF ZERO-VALENT METALLIC ELEMENT AND HYDRIDE AS NOVEL REAGENTS

(71) Applicant: Toyota Motor Engineering & Manufacturing North America, Inc., Erlanger, KY (US)

(72) Inventor: Michael P. Rowe, Pinckney, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/269,895

(22) Filed: May 5, 2014

(65) Prior Publication Data

US 2015/0098885 A1 Apr. 9, 2015

Related U.S. Application Data

(63) Continuation-in-part of application No. 14/046,081, filed on Oct. 4, 2013, now Pat. No. 8,980,219, and a continuation-in-part of application No. 14/219,823, filed on Mar. 19, 2014.

(51) Int. Cl.
   *C01B 6/04* (2006.01)
   *C01B 6/24* (2006.01)

(52) U.S. Cl.
   CPC ..................................... *C01B 6/246* (2013.01)

(58) Field of Classification Search
   CPC .......... C01B 6/003; C01B 6/006; C01B 6/06; C01B 3/0026; C01B 3/0031; H01M 4/04; H01M 8/00; H01M 8/10
   USPC ........................................ 423/644; 241/26, 27
   See application file for complete search history.

(56) References Cited

U.S. PATENT DOCUMENTS

| 7,041,350 B1 | 5/2006 | Rule et al. |
| 2005/0217427 A1 | 10/2005 | Suthersan et al. |
| 2009/0264277 A1 | 10/2009 | Raj et al. |

FOREIGN PATENT DOCUMENTS

| WO | 2012007830 A1 | 1/2012 |
| WO | WO 2012007830 A1 * | 1/2012 |

OTHER PUBLICATIONS

Schüth et al. "Light metal hydrides and complex hydrides for hydrogen storage", 2004, Chem. Commn., 2249-2258.*
Varin et al, "The effects of ball milling and nanometrick nickel additive on the hydrogen desorption from lithium borohydride and manganese chloride (3LiBH4 + MnCl2) mixture", Int. J. Hydrogen Energy, 35 (2010) 3588-3597.

(Continued)

*Primary Examiner* — Stanley Silverman
*Assistant Examiner* — Syed Iqbal
(74) *Attorney, Agent, or Firm* — Christopher G. Darrow; Darrow Mustafa PC

(57) ABSTRACT

A composition and its method of production are provided. The composition includes at least one zero-valent metallic element atom in complex with at least one hydride molecule. The method of production includes ball-milling an elemental metal in a high-surface area form, with a hydride. The composition can be useful as a reagent for the synthesis of zero-valent metallic elemental nanoparticles.

20 Claims, 20 Drawing Sheets

(56) References Cited

OTHER PUBLICATIONS

Rowe et al., "Stable Complexes of Zero-Valent Metal and Hydride as Novel Reagents" U.S. Appl. No. 14/046,0861, filed Oct. 4, 2014.
Rowe et al., "Stable Complexes of Zero-Balent Metallic Element and Hydride as Novel Reagents" U.S. Appl. No. 14/219,823, filed Mar. 19, 2014.
Rowe, "Stable Complexes of Multiple Zero-Valent Metals and Hydride as Novel Reagents". U.S. Appl. No. 14/219,815, filed Mar. 19, 2014.
Rowe et al., "Stable Complexes of Non-Metal Elements and Hydride as Novel Reagents". U.S. Appl. No. 14/269,909, filed May 5, 2014.
Imamura et al.; "Dehydriding of Sn/MgH2 nanocomposite formed by ball milling of MgH2 with Sn"; International Journal of Hydrogen Energy; 2007 (available online Jul. 23, 2007); in 4 pages.
Chen et al.; "Improved Dehydrogenation Properties of Ca(BH4)2•nNH3 (n = 1, 2, and 4) Combined with Mg(BH4)2"; The Journal of Physical Chemistry; Sep. 17, 2012; in 7 pages.
Wronski et al.; "A new nanonickel catalyst for hydrogen storage in solid-state magnesium hydrides"; International Journal of Hydrogen Energy; 2011 (available online Sep. 9, 2010); in 8 pages.

* cited by examiner

STABLE COMPLEXES OF ZERO-VALENT METALLIC ELEMENT AND HYDRIDE AS NOVEL REAGENTS

CROSS-REFERENCE TO RELATED APPLICATIONS

This application is a continuation-in-part of application Ser. No. 14/046,081, filed 4 Oct. 2013, and a continuation-in-part of application Ser. No. 14/219,823, filed 19 Mar. 2014, each of which is herein incorporated by reference in its entirety.

TECHNICAL FIELD

The present invention relates in general to a composition of matter composed of zero-valent metallic element in stable complex with one or more hydride molecules and in particular to zero-valent manganese or tin in complex with lithium borohydride, and also to a method for synthesizing the complex.

BACKGROUND

Hydrides, compounds in which metals or metalloids are bound directly to hydrogen, are relatively energetic molecules with a large variety of known and developing applications in chemistry and energy technology. Such applications include uses as reducing agents, hydrogenation catalysts, desiccants, potent bases, components in rechargeable batteries, and potentially as solid hydrogen storage vehicles in fuel cell technology.

Metal nanoparticles, particles of elemental metal in pure or alloyed form with a dimension less than 100 nm, have unique physical, chemical, electrical, magnetic, optical, and other properties in comparison to their corresponding bulk metals. As such they are in use or under development in fields such as chemistry, medicine, energy, and advanced electronics, among others.

Synthetic methods for metallic nanoparticles are typically characterized as being "top-down" or "bottom-up" and comprise a variety of chemical, physical, and even biological approaches. Top-down techniques involve the physical breakdown of macroscale metallic particles, using a variety of energy inputs, into nanoscale particles. Bottom-up methods involve the formation of nanoparticles from isolated atoms, molecules, or clusters.

Physical force methods for top-down metal nanoparticle synthesis have included milling of macroscale metal particles, laser ablation of mascroscale metals, and spark erosion of macroscale metals. Chemical approaches to bottom-up synthesis commonly involve the reduction of metal salt to zero-valent metallic element with nucleation seed particles or self-nucleation and growth into metal nanoparticles.

While each of these methods can be effective in certain circumstances, each also has disadvantages or situational inapplicability. Direct milling methods can be limited in the size of particles obtainable (production of particles smaller than ~20 nm is often difficult) and can lead to loss of control of the stoichiometric ratios of alloys. Other physical methods can be expensive or otherwise unamenable to industrial scale. On the other hand, chemical reduction techniques can fail, for example in situations where metallic cations are resistant to chemical reduction. Mn(II) for example is virtually impervious to in situ chemical reduction, making this approach inapplicable to the preparation of $Mn^0$, or $Mn^0$-containing, nanoparticles.

The present disclosure demonstrates reagents for synthesizing nanoparticles of a wide variety of metals.

SUMMARY

A composition of zero-valent metallic element in complex with hydride and a method of synthesizing the composition are provided.

In one aspect a reagent complex according to the following formula is disclosed:

$$E^0 \cdot X_y \qquad \text{I,}$$

wherein $E^0$ is a zero-valent metallic element, X is a hydride, and y is an integral or fractional value greater than zero. In some variations, the zero-valent metallic element can be a transition metal, a post-transition metal, a lanthanide, or a metalloid, the hydride can be a complex metalloid hydride, and y can be four or less. In some instances, the zero-valent metallic element can be manganese, tin, tungsten, lanthanum, or germanium, the hydride can be lithium borohydride, and y can be one or two. In different variations, the zero-valent metallic element can be from any of Groups 3-15 of the periodic table, inclusive.

In another aspect a method for synthesizing a reagent complex is disclosed. The method includes a step of ball-milling a mixture which includes both a hydride and a preparation of a zero-valent metallic element. In some variations, the zero-valent metallic element can be a transition metal, a post-transition metal, a lanthanide, or a metalloid and the hydride can be a complex metalloid hydride.

In another aspect a composition is provided, the composition including a reagent complex synthesized by a method which includes a step of ball-milling a mixture which includes both a hydride and a preparation containing a zero-valent metallic element.

BRIEF DESCRIPTION OF THE DRAWINGS

Various aspects and advantages of the invention will become apparent and more readily appreciated from the following description of the embodiments taken in conjunction with the accompanying drawings, of which.

(LiBH$_4$)$_2$ complex synthesized by the disclosed method for synthesizing a reagent complex.

Figure 5A:
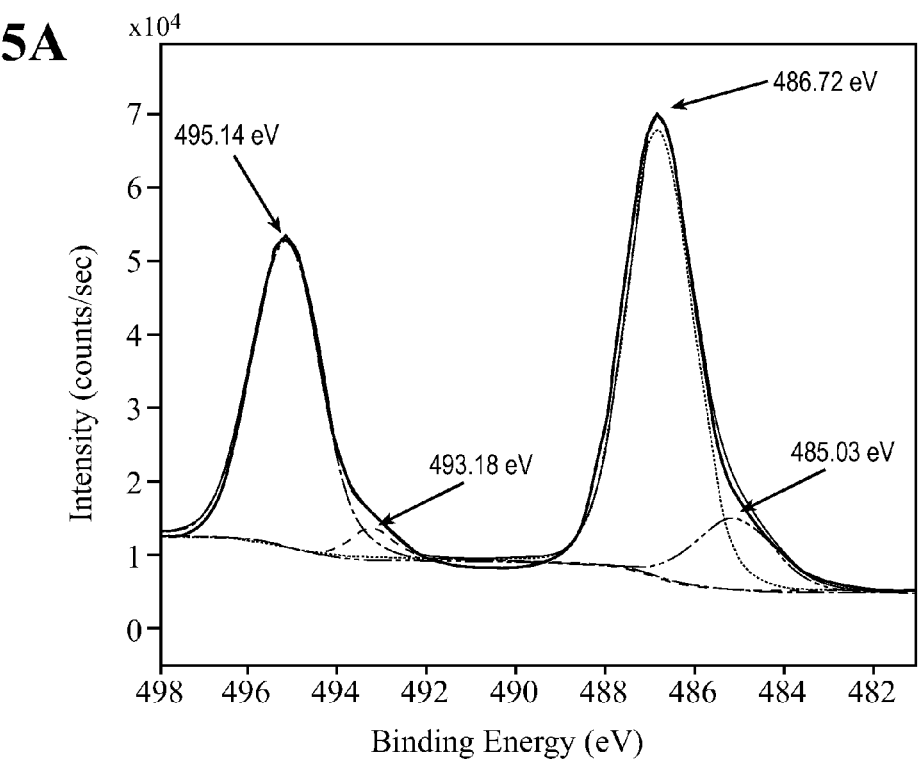
Figure 5B:
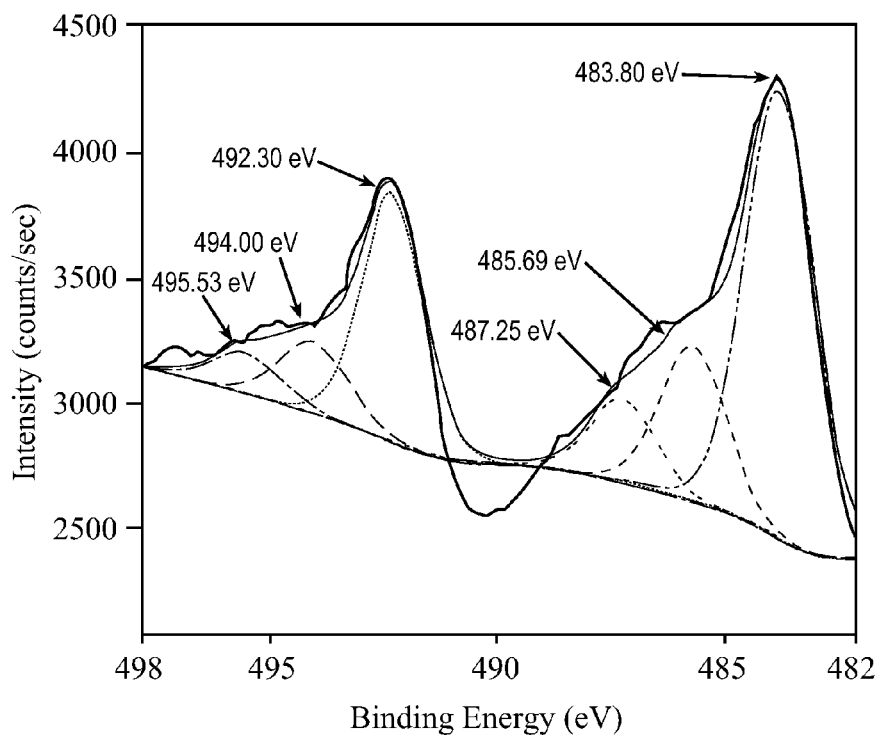
Figure 5C:
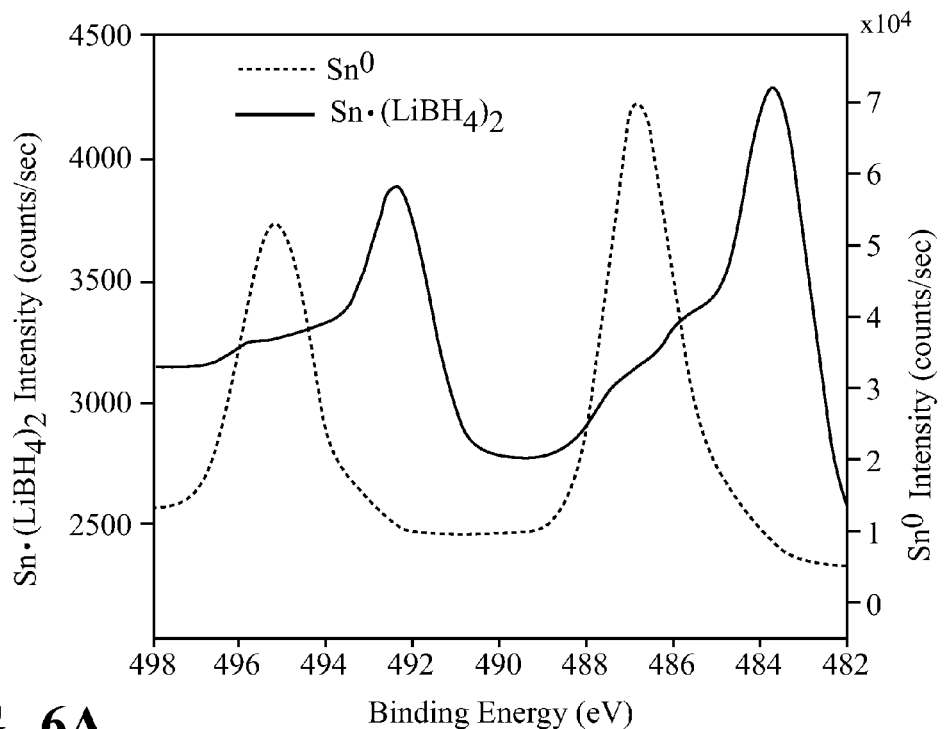

FIG. 5A is a tin x-ray photoelectron spectrum of Sn$^0$ powder;

FIG. 5B is a tin x-ray photoelectron spectrum of an Sn.(LiBH$_4$)$_2$ complex synthesized by the disclosed method for synthesizing a reagent complex;

FIG. 5C is an overlay of the x-ray photoelectron spectrum of Sn$^0$ powder of FIG. 5A and the x-ray photoelectron spectrum of a Sn.(LiBH$_4$)$_2$ complex of FIG. 5B.

Figure 6A:
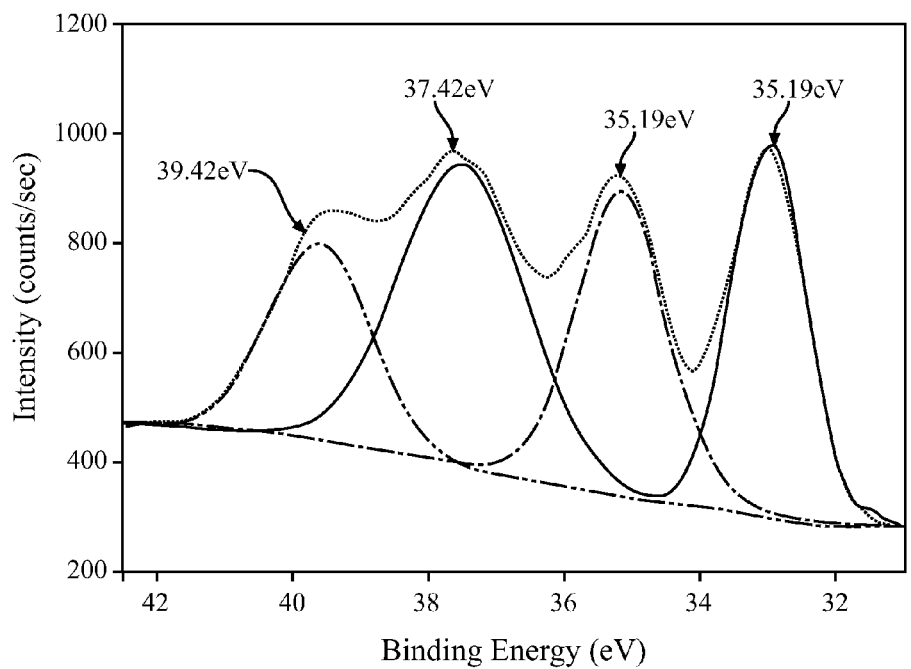
Figure 6B:
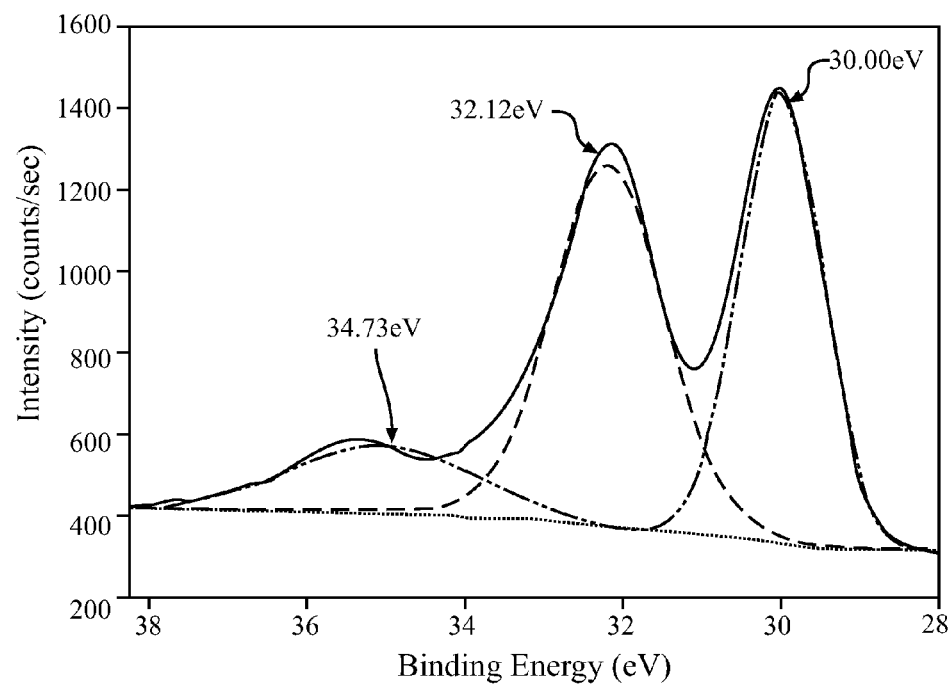
Figure 6C:
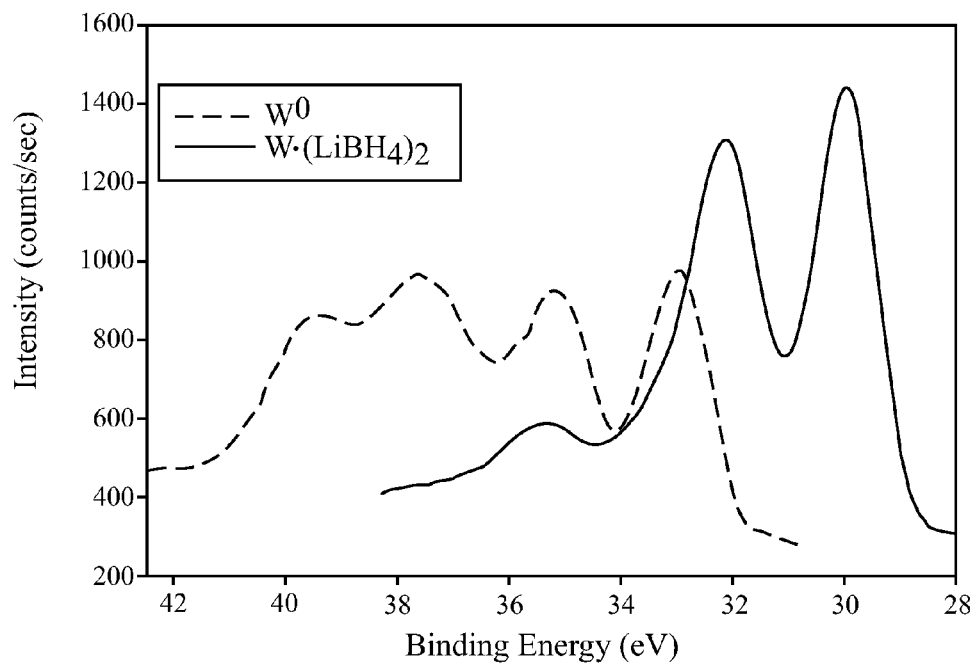

FIG. 6A is an x-ray photoelectron spectrum of W$^0$ powder;

FIG. 6B is an x-ray photoelectron spectrum of a W.(LiBH$_4$)$_2$ complex synthesized by the disclosed method for synthesizing a reagent complex;

FIG. 6C is an overlay of the x-ray photoelectron spectrum of W$^0$ powder of FIG. 6A and the x-ray photoelectron spectrum of a W.(LiBH$_4$)$_2$ complex of FIG. 6B.

Figure 7A:
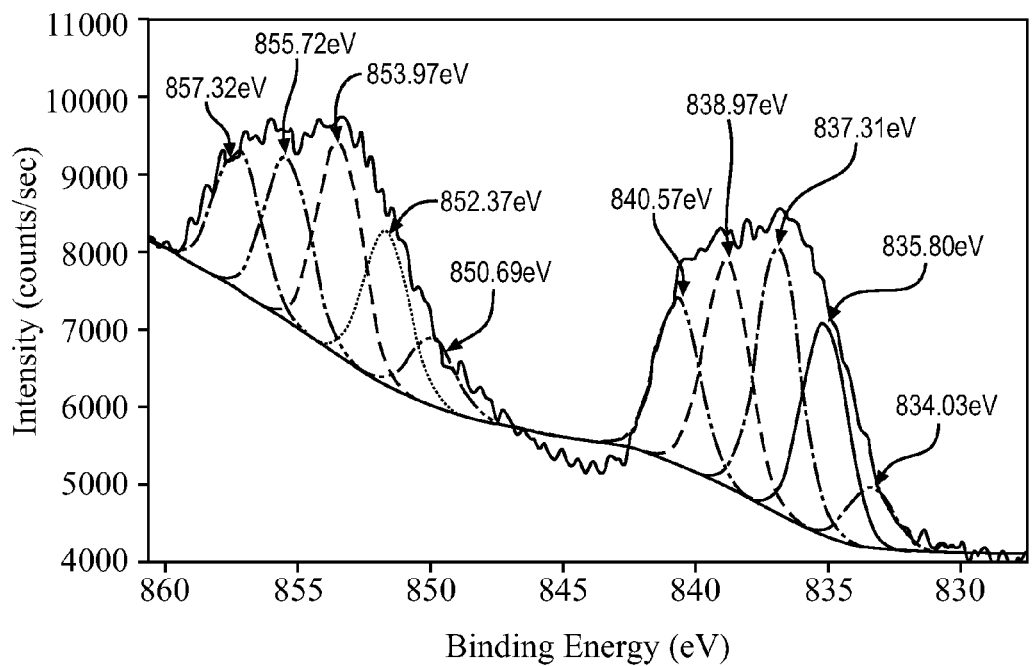
Figure 7B:
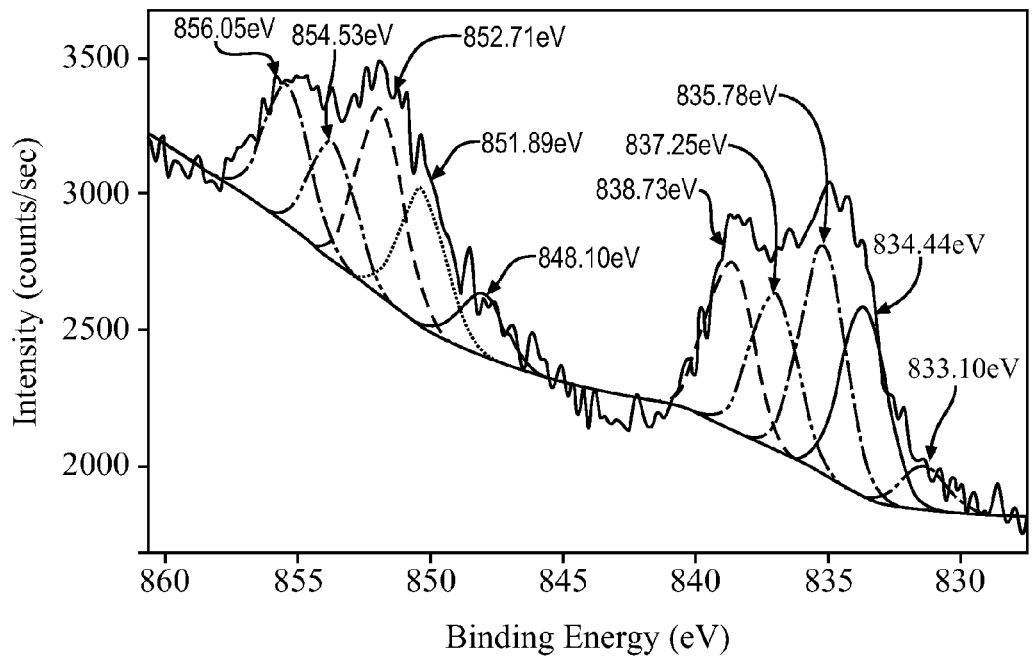
Figure 7C:
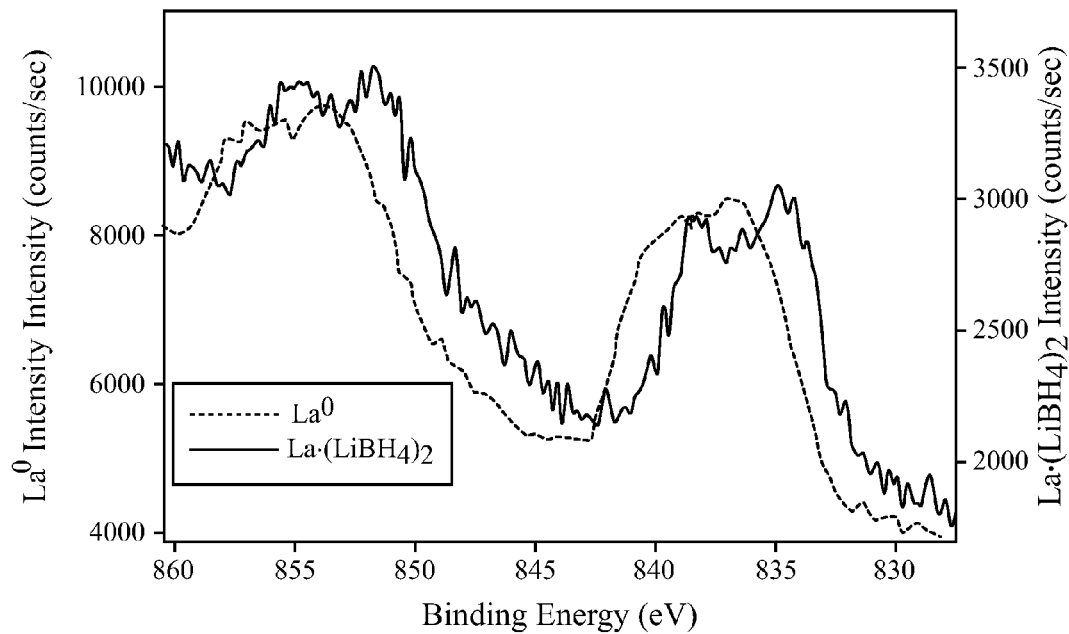

FIG. 7A is an x-ray photoelectron spectrum of La$^0$ powder;

FIG. 7B is an x-ray photoelectron spectrum of a La.(LiBH$_4$)$_2$ complex synthesized by the disclosed method for synthesizing a reagent complex;

FIG. 7C is an overlay of the x-ray photoelectron spectrum of La$^0$ powder of FIG. 7A and the x-ray photoelectron spectrum of a La.(LiBH$_4$)$_2$ complex of FIG. 7B.

Figure 8A:
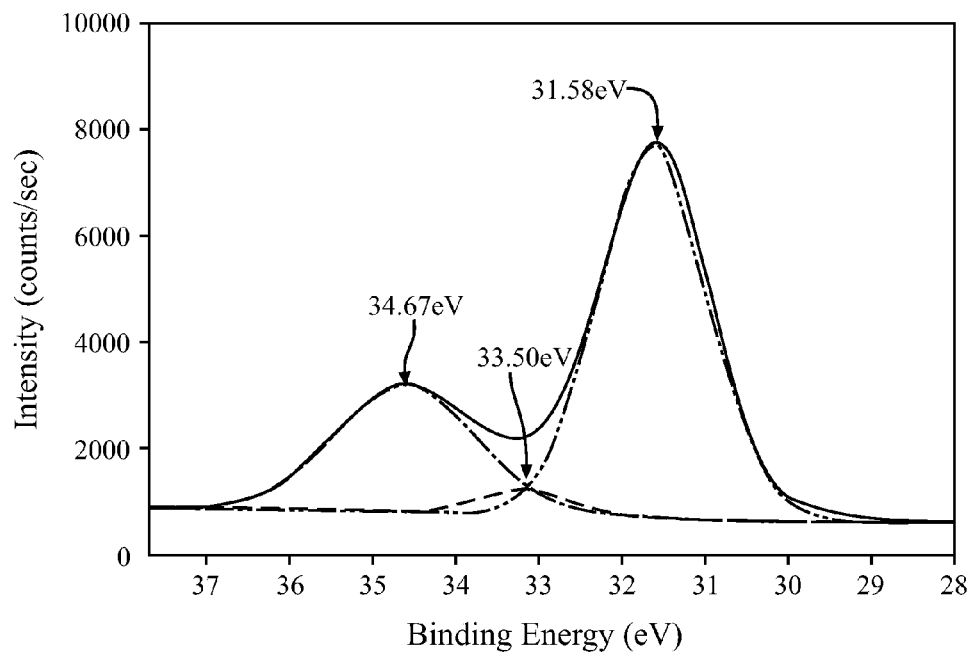
Figure 8B:
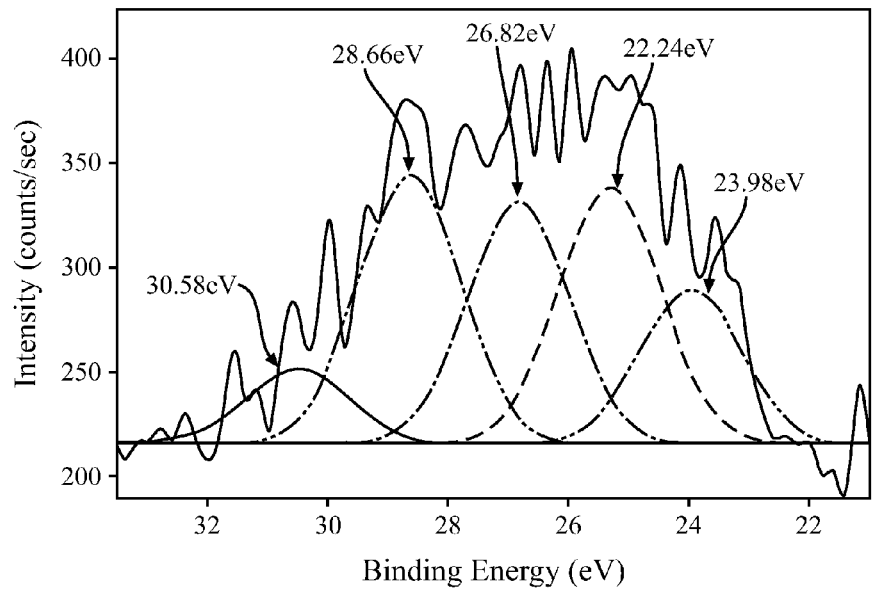
Figure 8C:
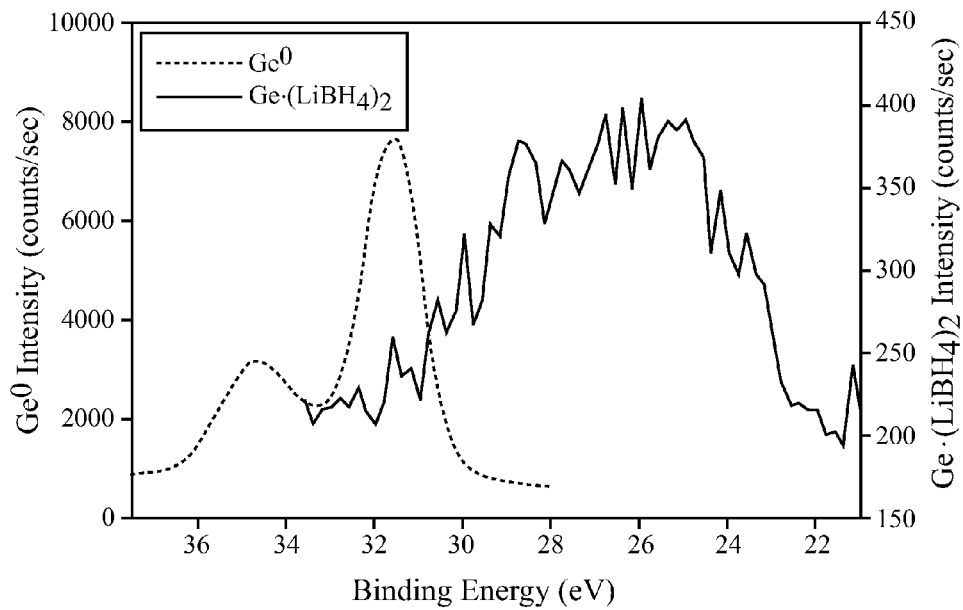
Figure 9A:
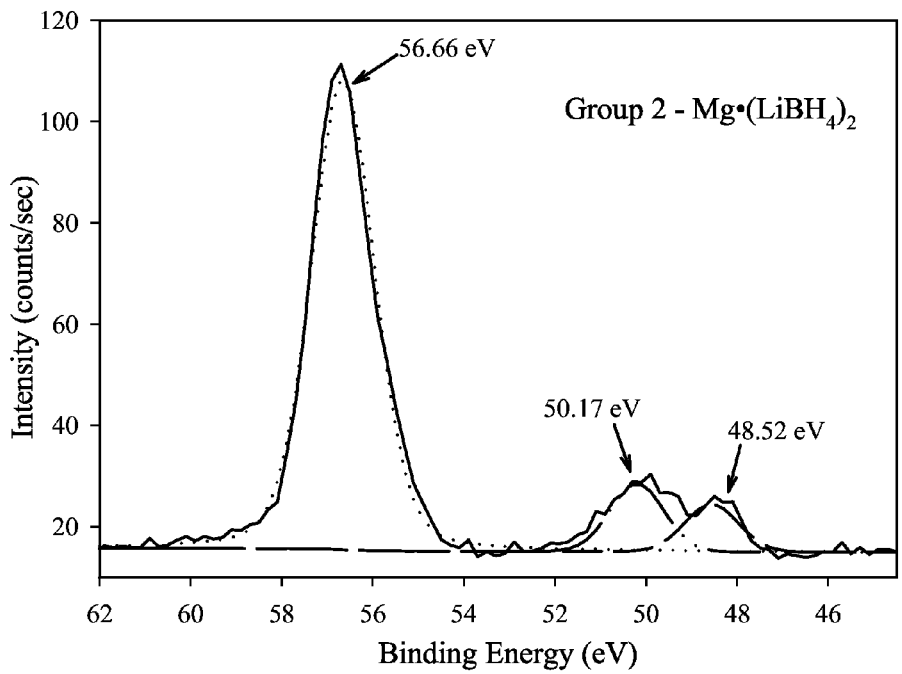
Figure 9B:
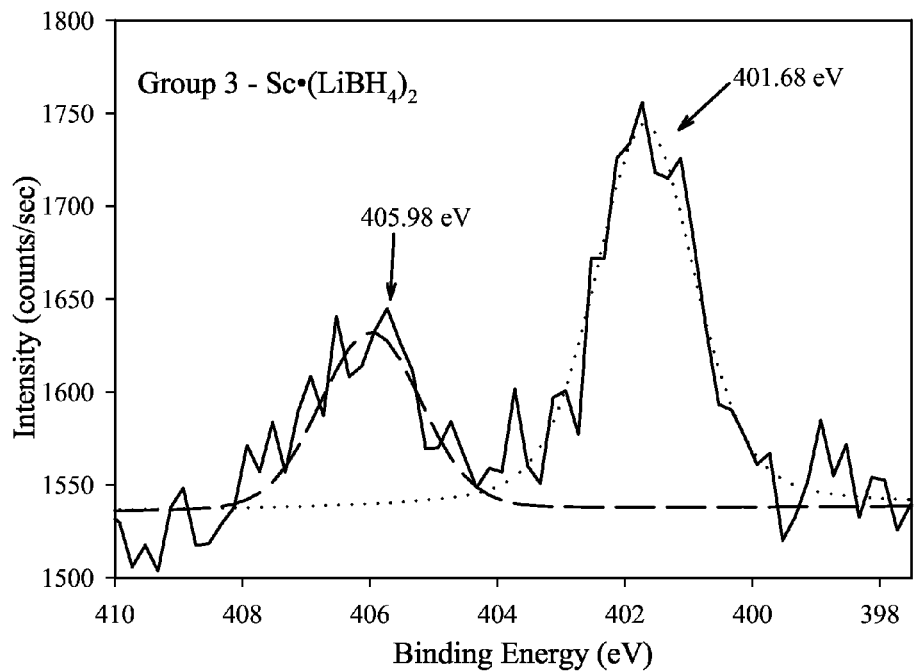
Figure 9C:
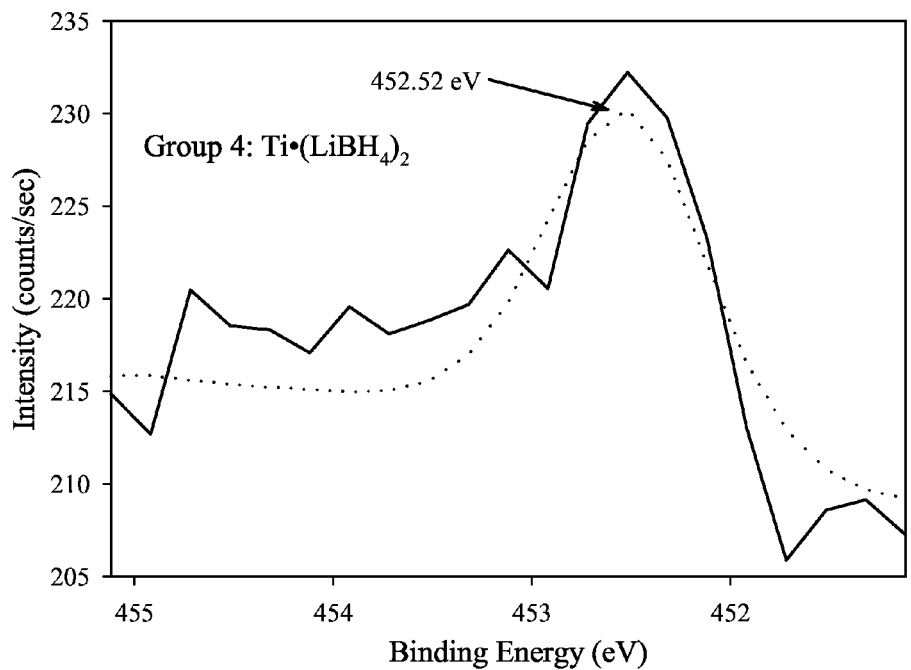
Figure 9D:
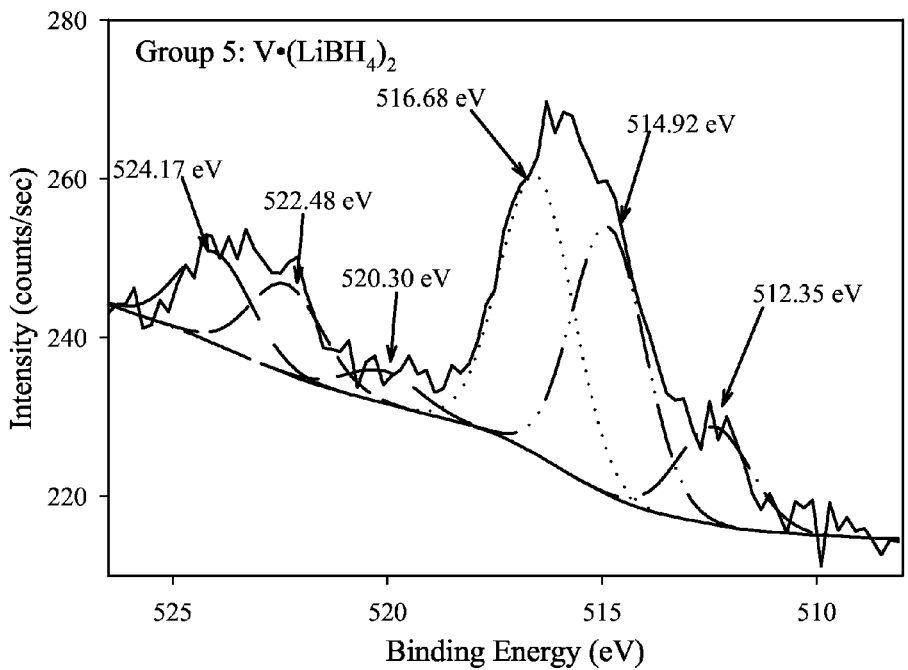
Figure 9E:
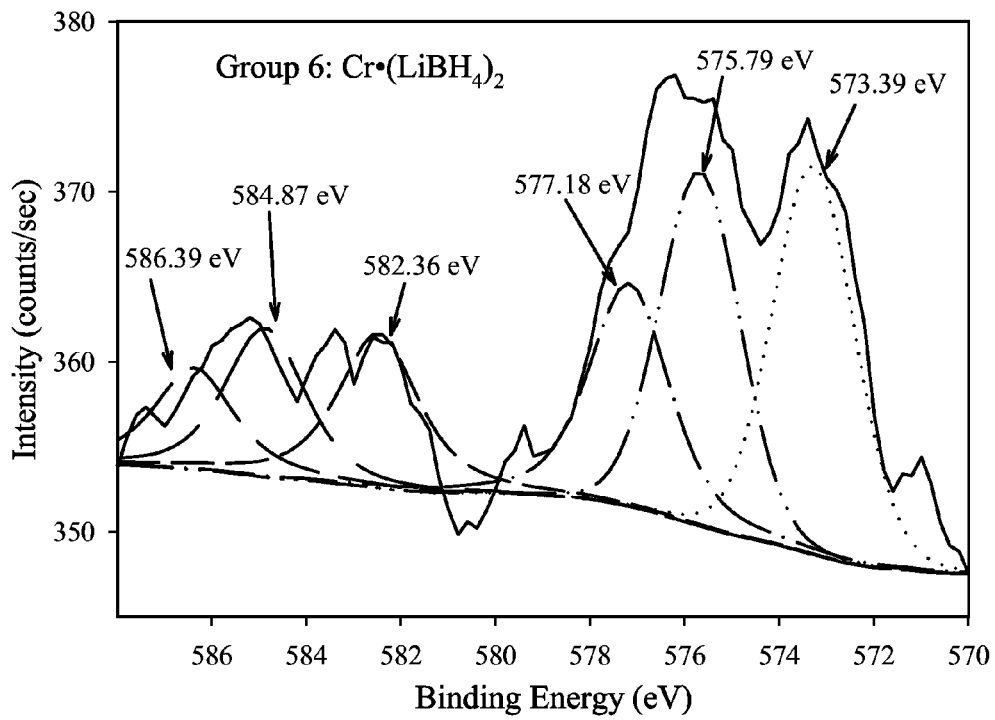
Figure 9F:
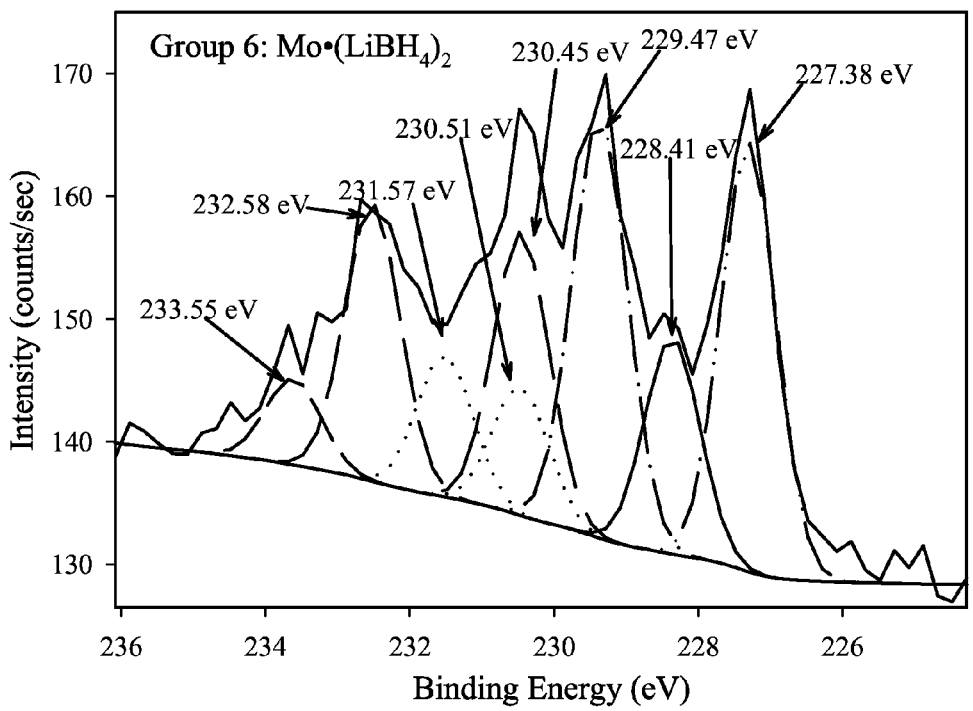
Figure 9G:
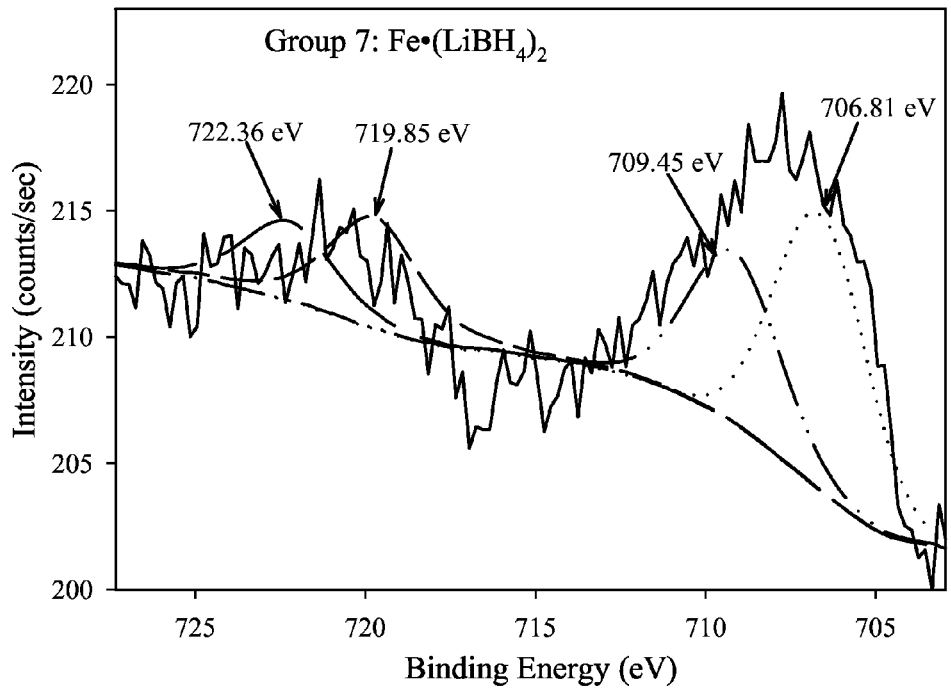
Figure 9H:
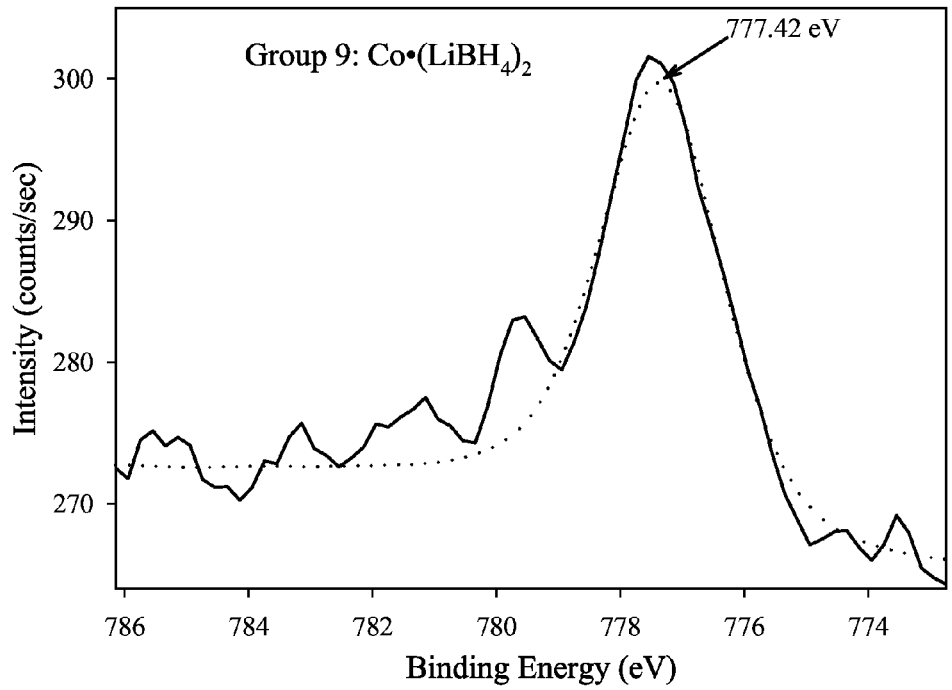
Figure 9I:
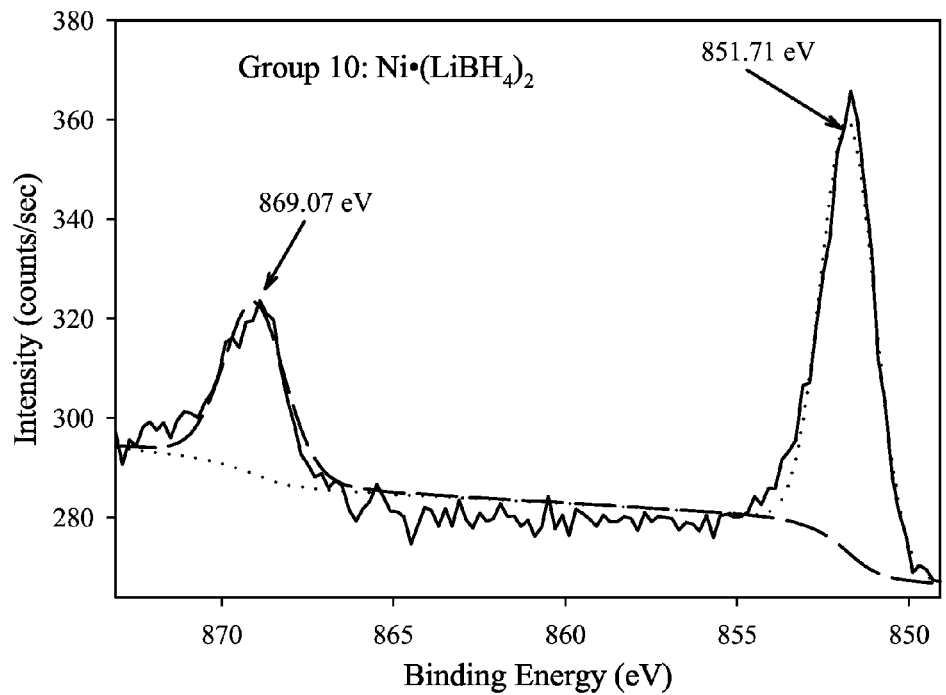
Figure 9J:
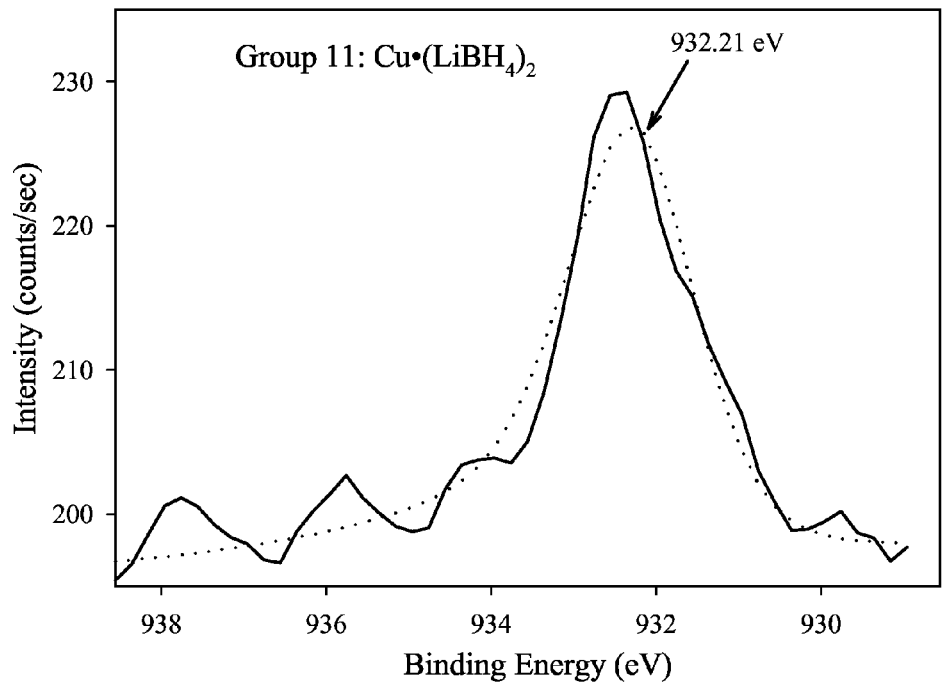
Figure 9K:
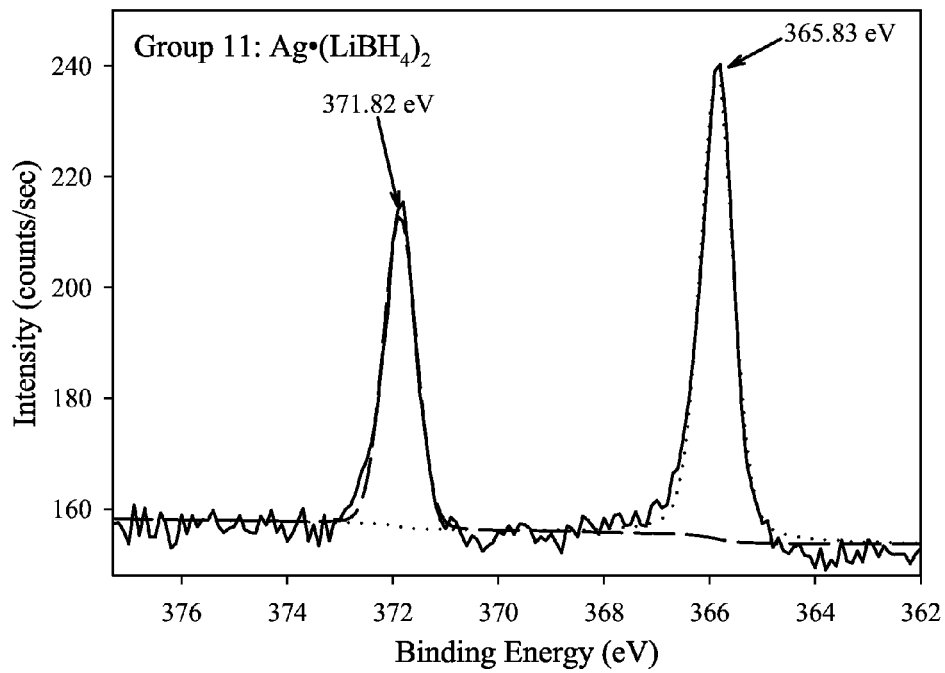
Figure 9L:
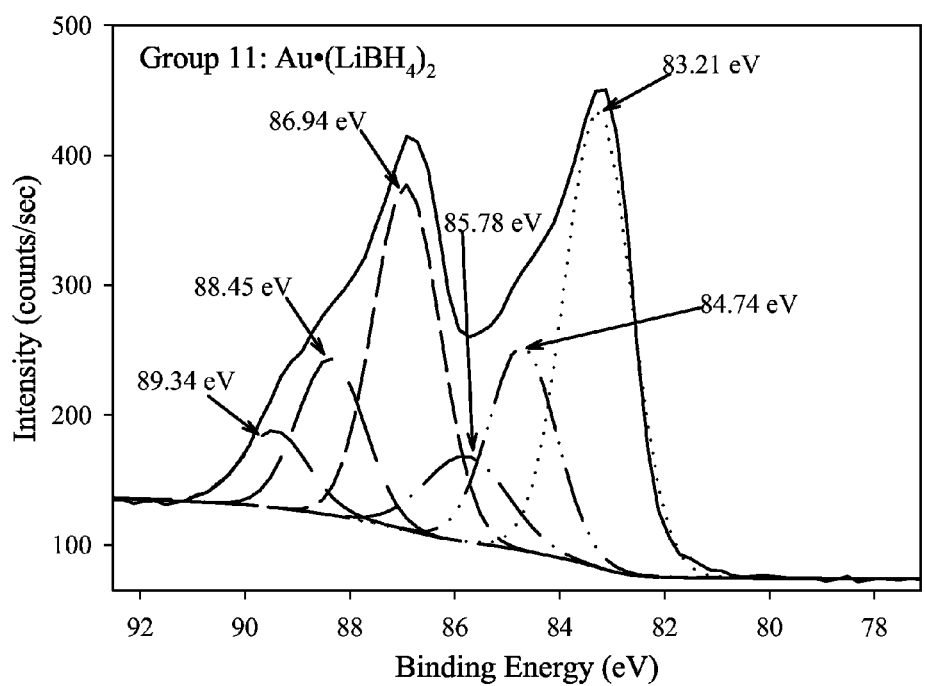
Figure 9M:
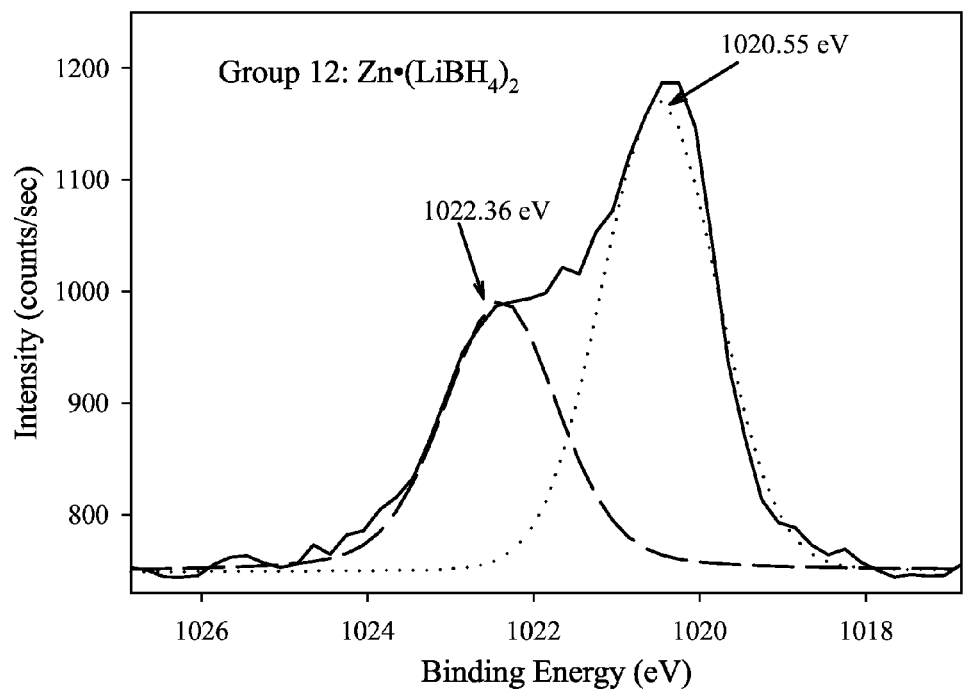
Figure 9N:
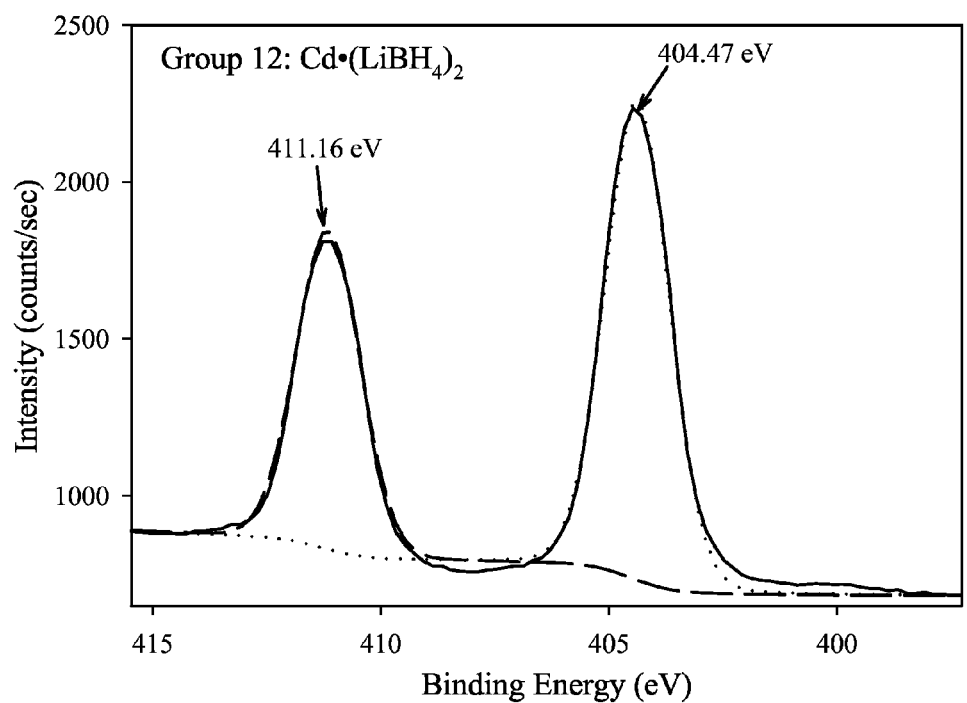
Figure 9O:
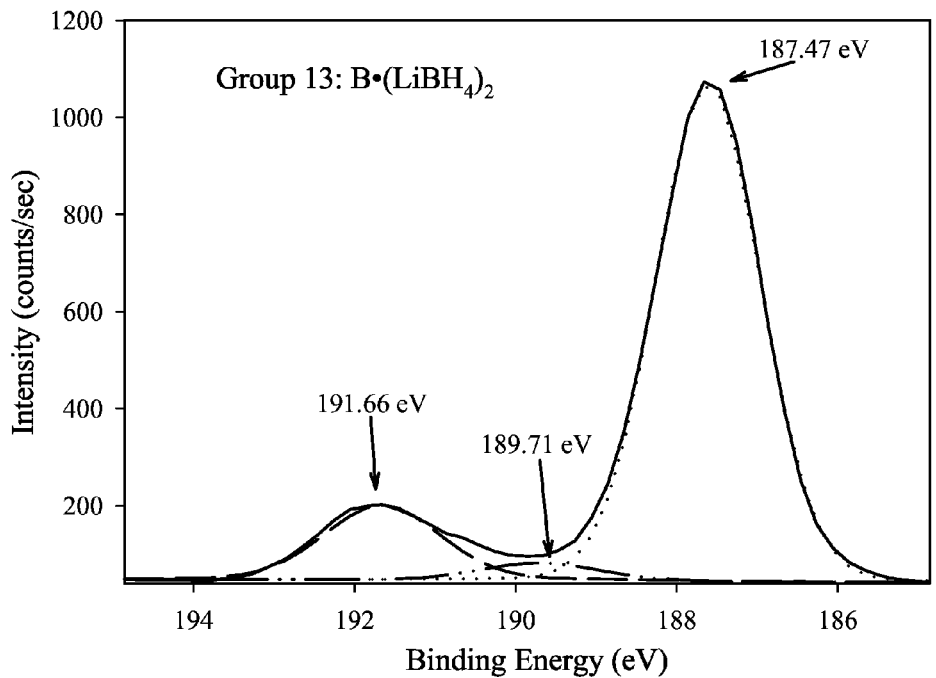
Figure 9P:
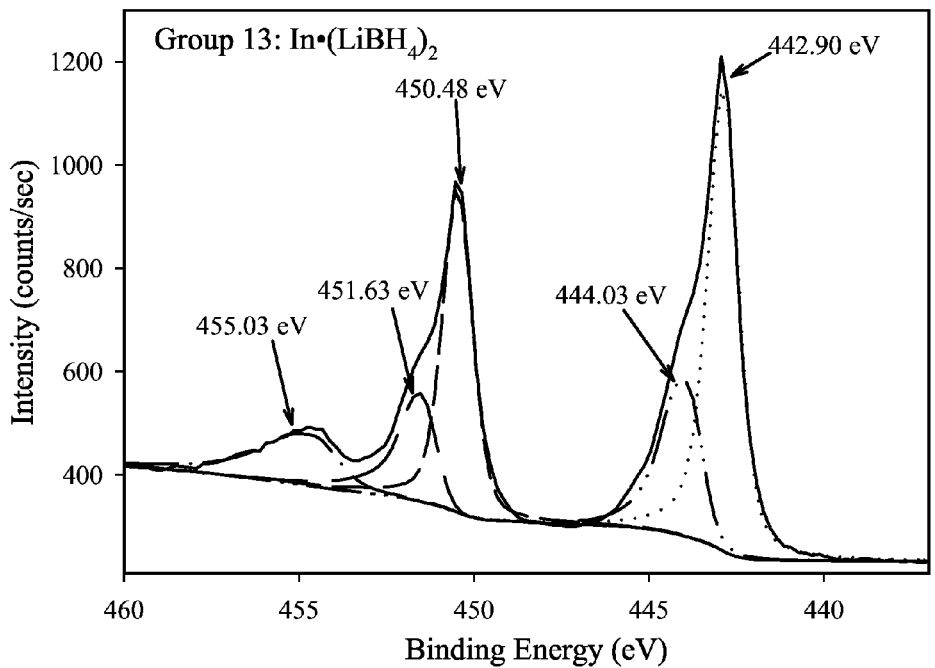
Figure 9Q:
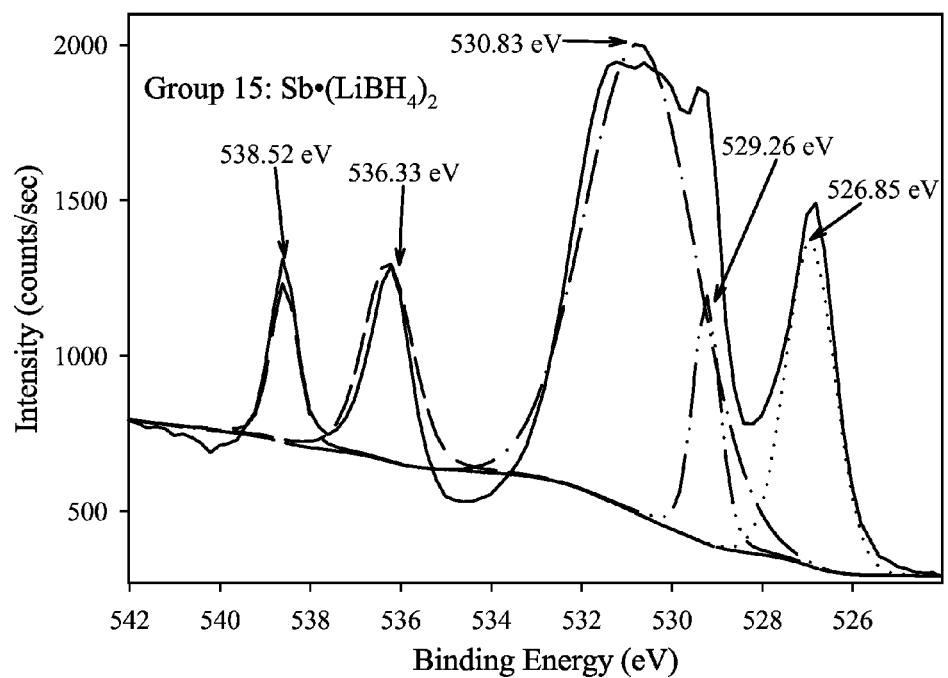
Figure 9R:
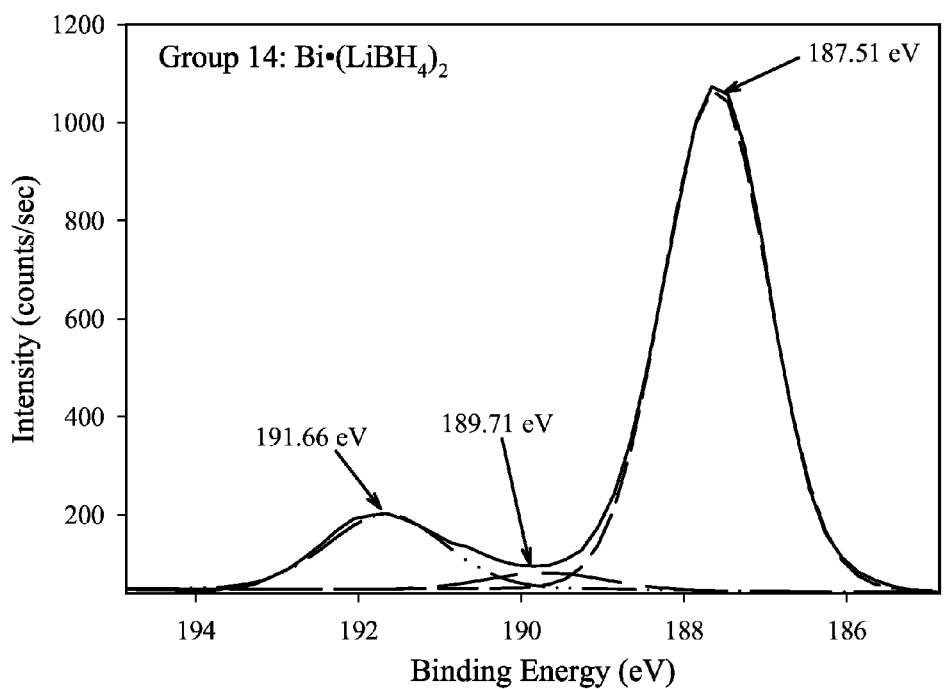

FIG. 8A is an x-ray photoelectron spectrum of Ge$^0$ powder;

FIG. 8B is an x-ray photoelectron spectrum of a Ge.(LiBH$_4$)$_2$ complex synthesized by the disclosed method for synthesizing a reagent complex;

FIG. 8C is an overlay of the x-ray photoelectron spectrum of Ge$^0$ powder of FIG. 5A and the x-ray photoelectron spectrum of a Ge.(LiBH$_4$)$_2$ complex of FIG. 5B;

FIG. 9A is an x-ray photoelectron spectrum of a Mg.(LiBH$_4$)$_2$ complex synthesized by the disclosed method for synthesizing a reagent complex;

FIG. 9B is an x-ray photoelectron spectrum of a Sc.(LiBH$_4$)$_2$ complex synthesized by the disclosed method for synthesizing a reagent complex;

FIG. 9C is an x-ray photoelectron spectrum of a Ti.(LiBH$_4$)$_2$ complex synthesized by the disclosed method for synthesizing a reagent complex;

FIG. 9D is an x-ray photoelectron spectrum of a V.(LiBH$_4$)$_2$ complex synthesized by the disclosed method for synthesizing a reagent complex;

FIG. 9E is an x-ray photoelectron spectrum of a Cr.(LiBH$_4$)$_2$ complex synthesized by the disclosed method for synthesizing a reagent complex;

FIG. 9F is an x-ray photoelectron spectrum of a Mo.(LiBH$_4$)$_2$ complex synthesized by the disclosed method for synthesizing a reagent complex;

FIG. 9G is an x-ray photoelectron spectrum of a Fe.(LiBH$_4$)$_2$ complex synthesized by the disclosed method for synthesizing a reagent complex;

FIG. 9H is an x-ray photoelectron spectrum of a Co.(LiBH$_4$)$_2$ complex synthesized by the disclosed method for synthesizing a reagent complex;

FIG. 9I is an x-ray photoelectron spectrum of a Ni.(LiBH$_4$)$_2$ complex synthesized by the disclosed method for synthesizing a reagent complex;

FIG. 9J is an x-ray photoelectron spectrum of a Cu.(LiBH$_4$)$_2$ complex synthesized by the disclosed method for synthesizing a reagent complex;

FIG. 9K is an x-ray photoelectron spectrum of a Ag.(LiBH$_4$)$_2$ complex synthesized by the disclosed method for synthesizing a reagent complex;

FIG. 9L is an x-ray photoelectron spectrum of a Au.(LiBH$_4$)$_2$ complex synthesized by the disclosed method for synthesizing a reagent complex;

FIG. 9M is an x-ray photoelectron spectrum of a Zn.(LiBH$_4$)$_2$ complex synthesized by the disclosed method for synthesizing a reagent complex;

FIG. 9N is an x-ray photoelectron spectrum of a Cd.(LiBH$_4$)$_2$ complex synthesized by the disclosed method for synthesizing a reagent complex;

FIG. 9O is an x-ray photoelectron spectrum of a B.(LiBH$_4$)$_2$ complex synthesized by the disclosed method for synthesizing a reagent complex;

FIG. 9P is an x-ray photoelectron spectrum of a In.(LiBH$_4$)$_2$ complex synthesized by the disclosed method for synthesizing a reagent complex;

FIG. 9Q is an x-ray photoelectron spectrum of a Sb.(LiBH$_4$)$_2$ complex synthesized by the disclosed method for synthesizing a reagent complex; and FIG. 9R is an x-ray photoelectron spectrum of a Bi.(LiBH$_4$)$_2$ complex synthesized by the disclosed method for synthesizing a reagent complex.

DETAILED DESCRIPTION

The chemical compositions provided herein can have substantial utility in the "wet chemistry" synthesis of high purity, elemental nanoparticles. Reagents suitable for synthesizing elemental metal or metalloid nanoparticles are disclosed. The disclosed methods for preparing the chemical compositions are straightforward, reproducible, and applicable to virtually any metallic elemental species.

Chemical compositions of the present disclosure generally include a zero-valent metallic element in complex with a hydride molecule. These compositions can be prepared by utilizing the disclosed methods, which generally include the act of ball-milling, together, an elemental material with a hydride.

As the term will be used herein, "zero-valent" refers to the condition of being in oxidation state zero. The term can alternatively be defined as describing the condition of being neither ionized nor covalently associated with other species. More generically, the phrase "zero-valent" as used herein refers to the condition of the material so described of being in elemental form.

As used herein, the term "metallic element" refers to a metal, a lanthanide, or a metalloid. A "metal" can refer to an alkaline earth metal, an alkali metal, a transition metal, or a post-transition metal. The phrase "transition metal" can refer to any D-block metal of Groups 3 through 12. The phrase "post-transition metal" can refer to Group 13 through 16 metals. The term "metalloid" can refer to any of boron, silicon, germanium, arsenic, antimony, tellurium, or polonium.

As used here, the term "hydride" refers generally to any molecular species capable of functioning as a hydrogen anion donor. In different instances, a hydride as referenced herein can be a binary metal hydride (e.g. NaH, or MgH$_2$), a binary metalloid hydride (e.g. BH$_3$), a complex metal hydride (e.g. LiAlH$_4$), or a complex metalloid hydride (e.g. LiBH$_4$ or Li(CH$_3$CH$_2$)$_3$BH). In some examples the hydride will be LiBH$_4$. The term hydride as described above can in some variations include a corresponding deuteride or tritide.

A reagent complex is disclosed, comprising a complex according to Formula I:

wherein E$^0$ is a zero-valent metallic element, wherein X is a hydride, and wherein y is an integral or fractional value greater than zero.

In some particular variations, a reagent complex is disclosed, comprising a complex according to Formula II:

wherein $M^0$ is a zero-valent metal, wherein X is a hydride, and wherein y is an integral or fractional value greater than zero.

Uses of the reagent complex can include as a reactant in bottom-up synthesis of metal nanoparticles, either pure or alloyed. The reagent complex can be useful in producing, in different instances, metal nanoparticles composed of any of a variety of metals and of a variety of nanoparticulate sizes. In some instances the reagent complex can be useful in producing metal nanoparticles which are substantially free of metal oxides.

Referring now to Formula I, the zero-valent metallic element can be any zero-valent metallic element. In some aspects the zero-valent metallic element can be a zero-valent transition metal, a zero-valent post-transition metal, or a zero-valent alkaline earth metal. Suitable transition metals include, but are not limited to cadmium, cobalt, copper, chromium, iron, manganese, gold, silver, platinum, titanium, nickel, niobium, molybdenum, rhodium, palladium, scandium, tungsten, vanadium, and zinc. Suitable post-transition metals include aluminum, gallium, indium, tin, thallium, lead, or bismuth. Suitable alkaline earth metals include any Group 2 element and in one disclosed Example is magnesium. In some instances the zero-valent metallic element can be manganese, tungsten, or tin.

In other aspects, the zero-valent metallic element can be a metalloid or a lanthanide. In some particular variations, the zero-valent metallic element can be germanium, bismuth, indium, or lanthanum.

In various aspects, the hydride as incorporated in the reagent complex can be any hydride, including binary metal hydride, binary metalloid hydride, complex metal hydride, or complex metalloid hydride. In some variations, the hydride can be a complex metalloid hydride. In some instances, the hydride can be a borohydride. In some instances, the hydride can be lithium borohydride.

In a set of Examples, a series of reagent complexes has been prepared having at least on representative zero-valent metallic element from each Group of the periodic table from Groups 2-15, inclusive. These include Mg (2), Sc (3), Ti (4), V (5), Cr (6), Mo (6), Fe (8), Co (9), Ni (10), Cu (11), Ag (11), Au (11), Zn (12), Cd (12), B (13), In (13), Ge (14), Sn (14) Sb (15), and Bi (15), where the group number of each element is indicated in parentheses. Thus, in different instances, the zero-valent metallic element can be any of: a Group 2 element, a Group 3 element, a Group 4 element, a Group 5 element, a Group 6 element, a Group 7 element, a Group 8 element, a Group 9 element, a Group 10 element, a Group 11 element, a Group 12 element, a Group 13 element, a Group 14 element, and a Group 15 element.

The value y according to Formula I can define the stoichiometry of hydride molecules to zero-valent metallic element atoms in the reagent complex. The value of y can include any integral or fractional value greater than zero. In some instances, y can be an integral or fractional value less than or equal to four. In some instances, y can be an integral or fractional value less than or equal to two. In some instances, y can be an integral or fractional value less than or equal to one.

The reagent complexes of the present disclosure can have any supramolecular structure, or no supramolecular structure. No structural details are implied by any of Formulae I-IV. Without being bound to any particular structure, and without limitation, the reagent complex could exist as a supramolecular cluster of many zero-valent elemental atoms interspersed with hydride molecules. The reagent complex could exist as a cluster of zero-valent elemental atoms in which the cluster is surface-coated with hydride molecules. The reagent complex could exist as individual zero-valent elemental atoms having little to no molecular association with one another, but each being associated with hydride molecules according to Formula I. Any of these microscopic structures, or any other consistent with Formula I, is intended to be within the scope of the present disclosure.

A method for synthesizing a reagent includes a step of ball-milling a mixture which includes both hydride and a preparation containing zero-valent metallic element. The resulting reagent, alternatively referred to herein as a reagent complex, comprises a complex according to Formula I:

$$E^0 \cdot X_y \qquad \qquad I,$$

wherein $E^0$ is at least one metal atom in oxidation state zero, derived from the preparation containing a zero-valent metallic element, wherein X is a hydride molecule, and wherein y is an integral or fractional value greater than zero.

In some particular variations, a method for synthesizing a reagent includes the step of ball-milling a mixture which includes both hydride and a preparation containing zero-valent metallic element. The resulting reagent, alternatively referred to herein as a reagent complex, comprises a complex according to Formula II:

$$M^0 \cdot X_y \qquad \qquad II,$$

wherein $M^0$ is at least one metal atom in oxidation state zero, derived from a preparation containing a zero-valent metal, wherein X is a hydride molecule, and wherein y is an integral or fractional value greater than zero.

As above, in specific, disclosed variations of the process for synthesizing a reagent where the complex is according to Formula I, the zero-valent metallic element is one of Mg, Sc, Ti, V, Cr, Mo, Fe, Co, Ni, Cu, Ag, Au, Zn, Cd, B, In, Ge, Sn, Sb, and Bi. Thus, in different instances of the process for synthesizing a reagent, the zero-valent metallic element can be any of: a Group 3 element, a Group 4 element, a Group 5 element, a Group 6 element, a Group 7 element, a Group 8 element, a Group 9 element, a Group 10 element, a Group 11 element, a Group 12 element, a Group 13 element, a Group 14 element, and a Group 15 element.

The preparation containing a zero-valent metallic element (referred to at times below simply as "the preparation") can be any composition consisting substantially of a zero-valent metallic element. In many instances the preparation containing a zero-valent metallic element will include zero-valent metallic element in a form which possesses a high surface-area-to-mass ratio. In some instances the zero-valent metallic element will be present in a powder form with a particulate size of −325 mesh. It is contemplated that the preparation containing a zero-valent metallic element can be a highly porous zero-valent metallic element, a zero-valent metallic element with a honeycomb structure, or some other preparation with a high surface-area-to-mass ratio.

In some instances the preparation containing a zero-valent metallic element can include a zero-valent transition metal. Suitable transition metals include, but are not limited to cadmium, cobalt, copper, chromium, iron, manganese, gold, silver, platinum, titanium, nickel, niobium, molybdenum, rhodium, palladium, scandium, vanadium, and zinc. In some instances the preparation containing a zero-valent metallic element can include a post-transition metal. Suitable post-transition metals include aluminum, gallium, indium, tin, thallium, lead, or bismuth.

It is to be understood that the zero-valent metallic element, be it transition metal, post-transition metal, alkali metal, or alkaline earth metal, will be in oxidation state zero. As used herein, "zero-valent" and "in oxidation state zero" are taken to mean that the material can exhibit a substantial but not necessarily complete zero oxidation state. For example, the preparation containing a zero-valent metallic element can include some surface impurities such as oxides.

It is contemplated that the phrase "high-surface-area-to-mass ratio" can encompass a broad range of surface-area-to-mass ratios and that, in general, the surface-area-to-mass ratio of the preparation containing a zero-valent metallic element employed will be that which is required by the time constraints of the method for synthesizing a reagent. In general, a higher surface-area-to-mass ratio of the preparation containing a zero-valent metallic element will lead to a more rapid completion of the method for synthesizing a reagent. In cases in which the preparation containing a zero-valent metallic element is composed of a powder of a zero-valent metallic element, smaller particle size of the powder of a zero-valent metallic element will lead to a more rapid completion of the method for synthesizing a reagent.

In some variations of the method for synthesizing a reagent, the hydride and the preparation containing a zero-valent metallic element can be present during the ball-milling step in a 1:1 stoichiometric ratio of hydride molecules to metal atoms contained in the preparation containing a zero-valent metallic element. In other variations the stoichiometric ratio can be 2:1, 3:1, 4:1 or higher. In some variations the stoichiometric ratio of hydride to elemental metal atoms in the preparation containing a zero-valent metallic element can also include fractional quantities, such as 2.5:1.

Referring now to FIGS. 1-9, the following spectroscopic data illustrate some properties of reagent complexes of the present disclosure. The spectroscopic data in some cases also illustrate properties of example materials that can be used in the method for synthesizing a reagent complex. In all instances, reagent complexes were prepared by the disclosed method for synthesizing a reagent complex.

Figure 1A:
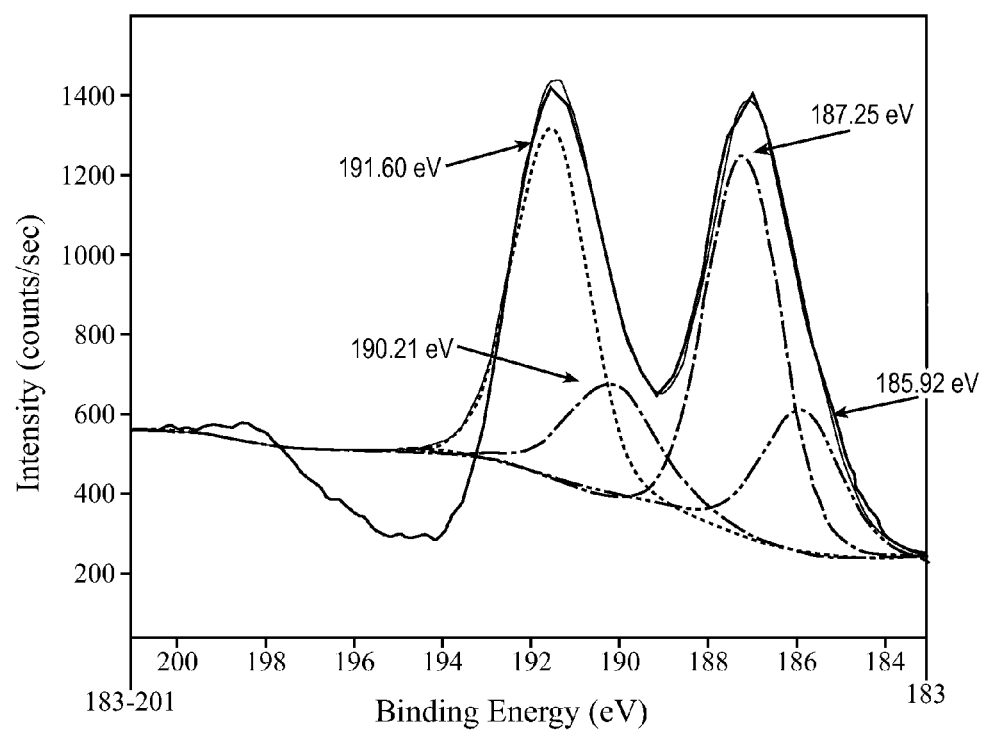
FIG. 1A is a boron x-ray photoelectron spectrum of a $LiBH_4$.
Figure 1B:
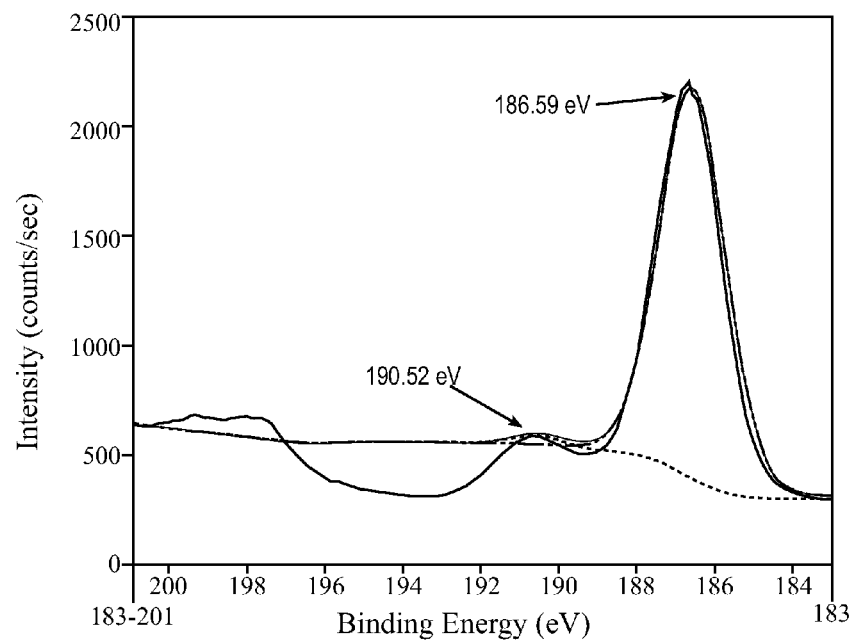
FIG. 1B is a boron x-ray photoelectron spectrum of a $Mn \cdot LiBH_4$ complex synthesized by a disclosed method for synthesizing a reagent complex.
Figure 1C:
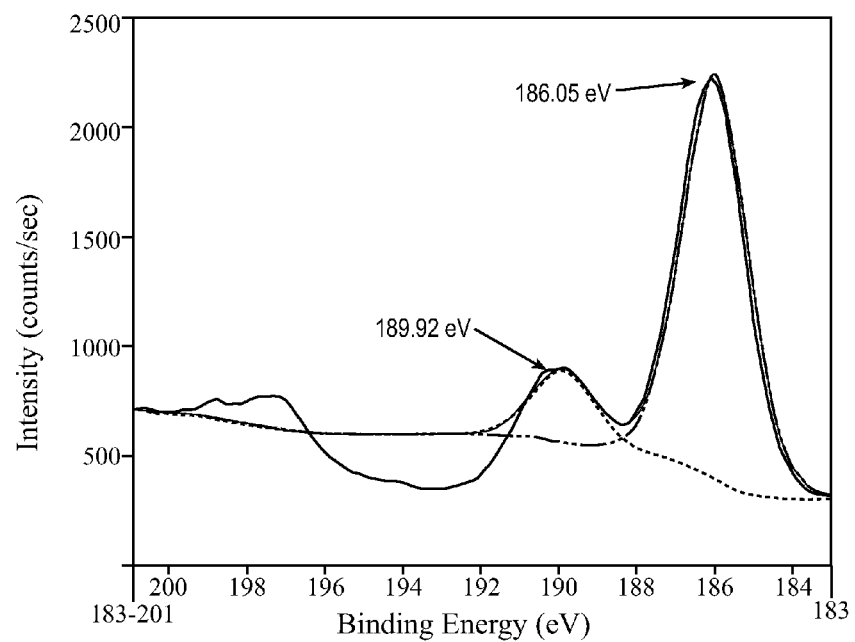
FIG. 1C is a boron x-ray photoelectron spectrum of a $Mn \cdot (LiBH_4)_2$ complex synthesized by the disclosed method for synthesizing a reagent complex.

FIG. 1A shows an x-ray photoelectron spectroscopy (XPS) scan in the boron region of a hydride ($LiBH_4$) which is not incorporated into a reagent complex. FIGS. 1B and 1C show analogous boron XPS scans of reagent complexes $Mn.LiBH_4$ and $Mn.(LiBH_4)_2$, respectively. Heavy solid lines show the raw XPS data while light solid lines show adjusted data. Dashed and/or dotted lines show deconvoluted individual peaks. The uncomplexed $LiBH_4$ of FIG. 1A shows two large peaks centered at 191.60 and 187.25 eV and two smaller peaks centered at 190.21 and 185.92 eV.

Comparing now FIG. 1B to FIG. 1A, ball-milling of the $LiBH_4$ with an equimolar quantity of a preparation containing zero-valent manganese virtually eliminates three of the boron peaks, with only a peak centered at 186.59 eV remaining. The change in boron XPS spectrum of the $LiBH_4$, resulting from ball-milling with the preparation containing a zero-valent element, can be taken as indicative of formation of a complex according to Formula I. As shown by comparison to FIG. 1C, ball-milling of $LiBH_4$ with a 2-fold molar excess of zero-valent manganese, instead of an equimolar quantity, leads to re-emergence of a boron peak centered at 189.92 eV. This could indicate that a portion of $LiBH_4$ is uncomplexed.

Figure 2A:
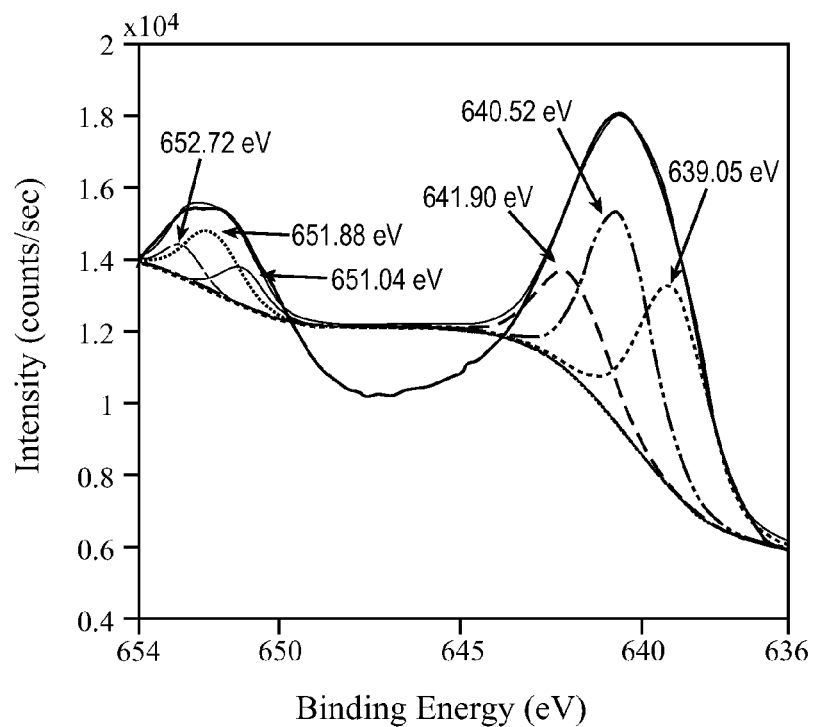
FIG. 2A is a manganese x-ray photoelectron spectrum of $Mn^0$ powder.
Figure 2B:
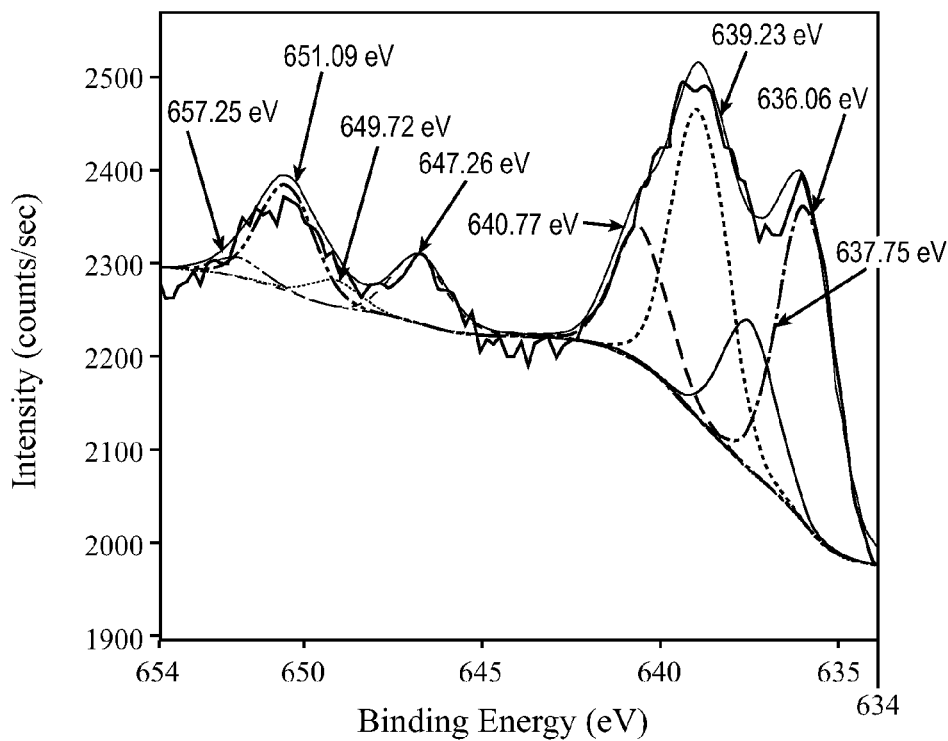
FIG. 2B is a manganese x-ray photoelectron spectrum of a $Mn \cdot (LiBH_4)_2$ complex synthesized by the disclosed method for synthesizing a reagent complex.

FIG. 2A shows an XPS scan of manganese powder. FIG. 2B shows a manganese-region XPS scan of $Mn.(LiBH_4)_2$. Heavy solid lines again show the raw XPS data while light solid lines show adjusted data. Dashed and/or dotted lines show deconvoluted individual peaks. As seen in FIG. 2A, the spectrum of manganese powder includes two broad peaks, each consisting of three component peaks observable after deconvolution. Referring again to FIG. 2A and focusing on the spectral region from ~639-642 eV, the three component peaks for the manganese powder can be assigned, based on published references, to manganese-oxide species (640.52 eV and 641.90 eV) and to zero-valent manganese (639.05 eV). The ball-milled reagent complex represented in FIG. 2B has lost the oxide peak at 641.90 eV but retains the oxide peak (the 640.77 eV peak of FIG. 2B is identifiable with the 640.52 eV peak of FIG. 2A after negligible shifting). The ball-milled reagent complex also retains the zero-valent manganese peak at 639.05 eV (after negligible shifting).

Figure 2C:
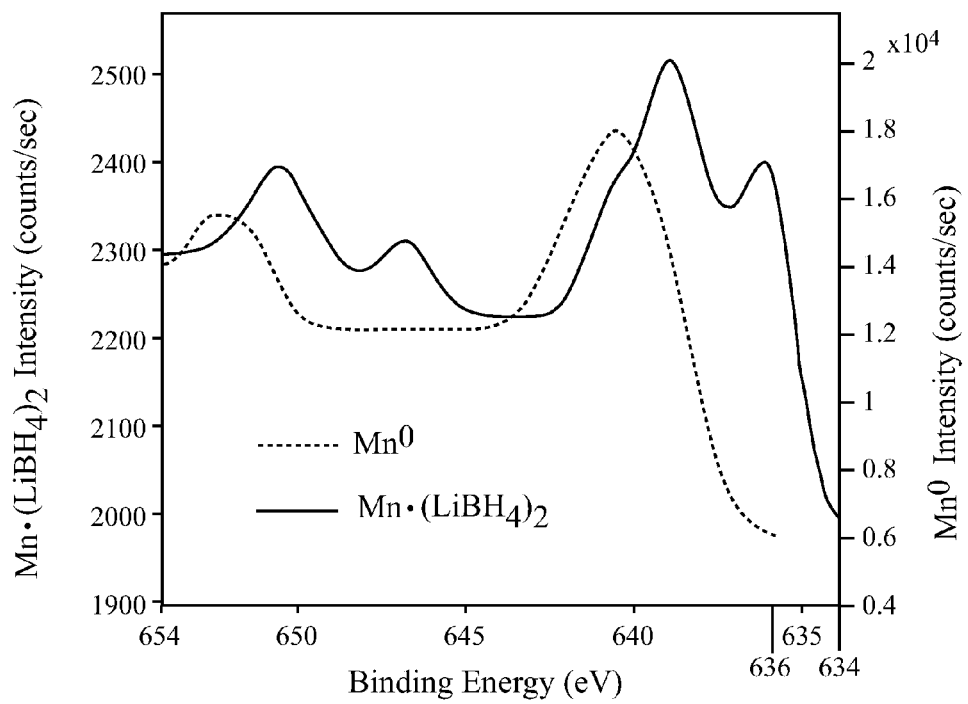
FIG. 2C is an overlay of the x-ray photoelectron spectrum of $Mn^0$ powder of FIG. 2A and the x-ray photoelectron spectrum of a $Mn \cdot (LiBH_4)_2$ complex of FIG. 2B.

Of significance in the spectrum of FIG. 2B, the ball-milled reagent complex displays a new phase with component peaks at 637.75 eV and 636.06 eV. These latter two can be assigned to manganese in complex with the hydride. An overlay of the acquired manganese XPS data for manganese powder and ball-milled $Mn.(LiBH_4)_2$ reagent complex is shown in FIG. 2C. The comparison illustrates the loss of at least one manganese-oxide peak and the appearance of the new phases, resulting in a general shift toward lower electronic binding energies.

Figure 3A:
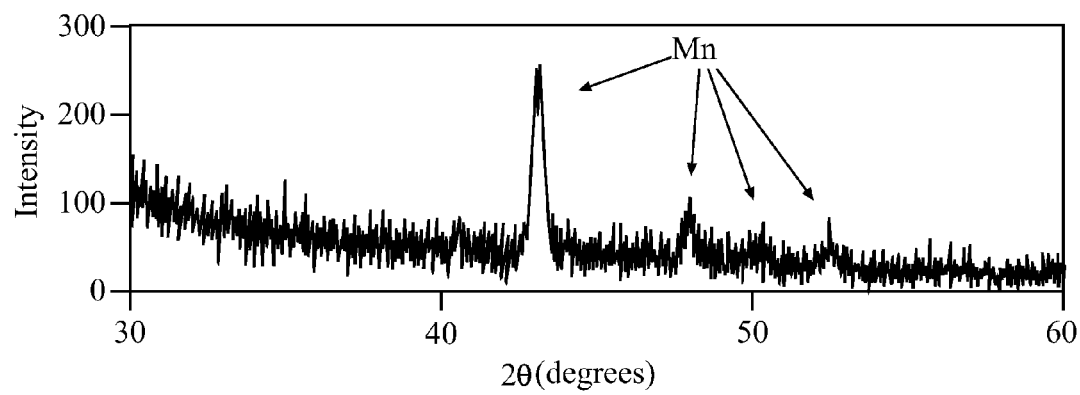
FIG. 3A is an x-ray powder diffraction scan of a $Mn \cdot LiBH_4$ complex synthesized by the disclosed method for synthesizing a reagent complex.
Figure 3B:
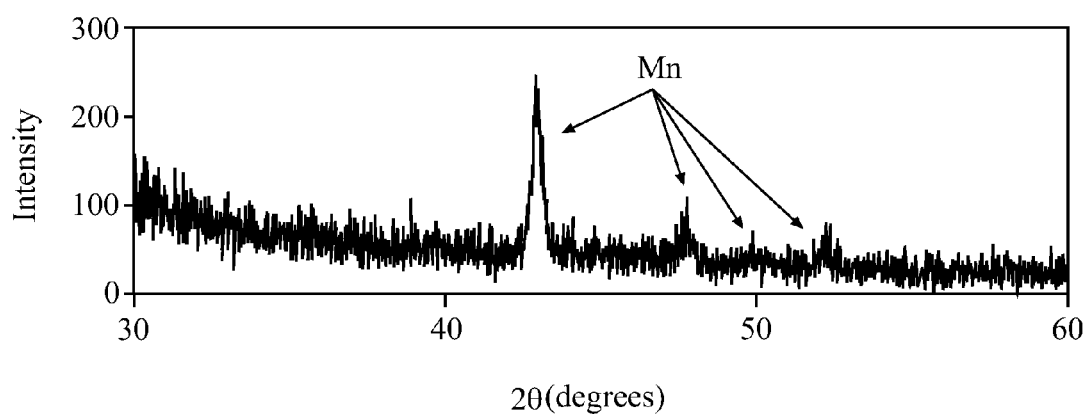
FIG. 3B is an x-ray powder diffraction scan of a $Mn \cdot (LiBH_4)_2$ complex synthesized by the disclosed method for synthesizing a reagent complex.

FIGS. 3A and 3B show XRD spectra of the $Mn.LiBH_4$ and $Mn.(LiBH_4)_2$ reagent complexes of FIGS. 1B and 1C, respectively. Both diffraction analyses suggest the samples are largely amorphous, as indicated by the general absence of peaks. Minor peaks consistent with 20 nm manganese metal are observed, while no peaks consistent with $LiBH_4$ or manganese oxide are evident.

Figure 4:
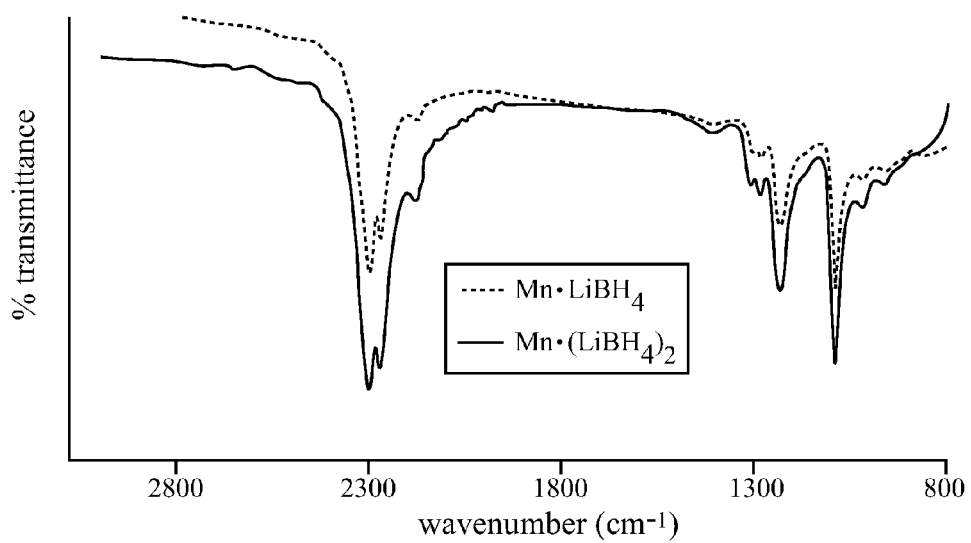
FIG. 4 is an overlay of an FT-IR spectrum of a $Mn \cdot LiBH_4$ complex synthesized by the method of FIG. 1 and an Mn.

An overlay of FT-IR scans for reagent complexes $Mn.LiBH_4$ and $Mn.(LiBH_4)_2$ is seen in FIG. 4. Both spectra have dominant features at 2299, 1230, and 1092 cm$^{-1}$ corresponding to IR-active modes of $BH_4^-$. This result suggests that the tetrahedral structure of the $BH_4^-$ is essentially unperturbed by incorporation of $LiBH_4$ into the reagent complex.

FIG. 5A shows an XPS scan of tin powder. FIG. 5B shows the corresponding XPS scan of a reagent complex synthesized therefrom, $Sn.(LiBH_4)_2$. Two major peaks at 495.14 and 486.72 eV and two minor peaks 493.18 and 485.03 eV in the tin powder data (FIG. 5A) shift substantially and/or disappear in the reagent complex (FIG. 5B). In their places, the reagent complex $Sn.(LiBH_4)_2$ has major peaks at 492.30 and 483.80 eV with minor peaks at 495.53, 494.00, 487.25 and 485.69 eV (FIG. 5B).

An overlay of the adjusted XPS data for the tin powder and the corresponding $Sn.(LiBH_4)_2$ reagent complex is shown in FIG. 5C. This comparison also indicates incorporation of tin into a reagent complex is accompanied by a spectral shift to lower electronic binding energies in the tin region XPS.

Referring now to FIGS. 6A and 6B, XPS spectra are shown for tungsten powder and for tungsten in complex with $LiBH_4$, respectively. The acquired spectrum is represented as a solid line while fitted component peaks are shown as various dashed and dotted lines. FIG. 6C shows the overlay of the $W^0$ and the $W.(LiBH_4)_2$ spectra. As the results of FIG. 6C make clear, complexation of $W^0$ with $LiBH_4$ is associated with a shift to lower binding energy of valence electrons of the metallic element, as was the case for $Mn^0$ and $Sn^0$, above.

Referring now to FIGS. 7A and 7B, XPS spectra are shown for lanthanum powder and for the reagent complex $La.(LiBH_4)_2$, respectively. FIG. 7C shows an overlay of the acquired spectra of FIGS. 7A and 7B.

XPS spectra for germanium powder and for $Ge.(LiBH_4)_2$ reagent complex are shown in FIGS. 8A and 8B, respectively. An overlay of the acquired spectra is shown in FIG. 8C. It is to be noted that while the previous data were for various metals, the data of FIGS. 8A through 8B show complex formation where the zero-valent element is a metalloid. The shift toward lower electronic binding energies upon complex formation is similar to that observed previously.

FIGS. 9A through 9R show XPS spectra of a series of reagent complexes having the formula $E^0 \cdot (LiBH_4)_2$ where $E^0$ is magnesium, scandium, titanium, vanadium, chromium, molybdenum, iron, cobalt, nickel, copper, silver, gold, zinc, cadmium, boron, indium, antimony, or bismuth, respectively.

Also disclosed is a reagent complex as described above by Formula I:

$$E^0 \cdot X_y \qquad\qquad\qquad I,$$

wherein $E^0$ is a zero-valent metallic element, derived from the preparation containing a zero-valent metallic element, wherein X is a hydride, and wherein y is an integral or fractional value greater than zero and wherein the reagent is prepared by a method for synthesizing a reagent comprising the step of ball-milling a hydride with a preparation containing a zero-valent metallic element.

In some particular variations, the reagent complex prepared by the method comprises a complex according to Formula II:

$$M^0 \cdot X_y \qquad\qquad\qquad II,$$

wherein $M^0$ is at least one metal atom in oxidation state zero, derived from a preparation containing a zero-valent metal, wherein X is a hydride molecule, and wherein y is an integral or fractional value greater than zero.

The zero-valent metallic element can be any zero-valent metallic element. In some aspects the zero-valent metallic element can be a zero-valent transition metal or a zero-valent post-transition metal. Suitable transition metals include, but are not limited to cadmium, cobalt, copper, chromium, iron, manganese, gold, silver, platinum, titanium, nickel, niobium, molybdenum, rhodium, palladium, scandium, vanadium, and zinc. Suitable post-transition metals include aluminum, gallium, indium, tin, thallium, lead, or bismuth. In some instances the zero-valent metallic element can be manganese, tin, tungsten, lanthanum, or germanium.

In various aspects, the hydride as incorporated in the reagent complex can be any hydride, including binary metal hydride, binary metalloid hydride, complex metal hydride, or complex metalloid hydride. In some variations, the hydride can be a complex metalloid hydride. In some instances, the hydride can be a borohydride. In some instanced, the hydride can be lithium borohydride.

The value y according to Formula I can define the stoichiometry of hydride molecules to zero-valent metallic element atoms in the reagent complex. The value of y can include any integral or fractional value greater than zero. In some instances, y can be an integral or fractional value less than or equal to four. In some instances, y can be an integral or fractional value less than or equal to two. In some instances, y can be an integral or fractional value less than or equal to one.

The preparation containing a zero-valent metallic element can be any composition consisting substantially of a zero-valent metallic element. In many instances the preparation containing a zero-valent metallic element will include zero-valent metallic element in a form which possesses a high surface-area-to-mass ratio. In some instances the zero-valent metallic element will be present in a powder form with a particulate size of −325 mesh. It is contemplated that the preparation containing a zero-valent metallic element can be a highly porous zero-valent metallic element, a zero-valent metallic element with a honeycomb structure, or some other preparation with a high surface-area-to-mass ratio.

The present invention is further illustrated with respect to the following examples. It needs to be understood that these examples are provided to illustrate specific embodiments of the present invention and should not be construed as limiting the scope of the present invention.

Example 1

One part manganese metal powder, of −325 mesh particle size, is mixed with one part or two parts $LiBH_4$, of total manganese metal and lithium borohydride powder mass of less than 10 grams, and ball-milled in a planetary ball-mill for 4 hours at 400 rpm (using a Fritsch pulervisette 7 planetary ball mill) in a 250 mL stainless steel airtight ball-mill jar with one ¾ inch, three ½ inch, and five ¼ inch 316 stainless steel ball bearings.

Example 2

One part tin metal powder, of −325 mesh particle size, is mixed with one part or two parts $LiBH_4$, of total tin metal and lithium borohydride powder mass of less than 10 grams, and ball-milled in a planetary ball-mill for 4 hours at 400 rpm (using a Fritsch pulervisette 7 planetary ball mill) in a 250 mL stainless steel airtight ball-mill jar with 1¾ inch, 3½ inch, and 5¼ inch 316 stainless steel ball bearings.

Example 3

Tungsten powder and lithium borohydride powder are added, in a 1:2 stoichiometric ratio, to a stainless steel ball mill under argon, with steel balls. This mixture is then milled in a planetary ball mill at 150 to 400 rpm (depending on hardness of metal) for 4 hours.

Example 4

Lanthanum powder and lithium borohydride powder are added, in a 1:2 stoichiometric ratio, to a stainless steel ball mill under argon, with steel balls. This mixture is then milled in a planetary ball mill at 150 to 400 rpm (depending on hardness of metal) for 4 hours.

Example 5

Germanium powder and lithium borohydride powder are added, in a 1:2 stoichiometric ratio, to a stainless steel ball mill under argon, with steel balls. This mixture is then milled in a planetary ball mill at 150 to 400 rpm (depending on hardness of metal) for 4 hours.

Metal powder (magnesium, scandium, titanium, vanadium, chromium, molybdenum, iron, cobalt, nickel, copper, silver, gold, zinc, cadmium, boron, indium, antimony, or bismuth) and lithium borohydride powder (in a 1:2 stoichiometric ratio) are added to a stainless steel ball mill jar under argon, with steel balls. This mixture is then milled in a planetary ball mill at 150 to 400 rpm (depending on hardness of metal) for 4 hours. The resulting products were scanned by XPS and the results are shown in FIGS. 9A through 9R, respectively.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A reagent complex comprising a complex according to Formula I, $$E^0 \cdot X_y \qquad \text{I,}$$

wherein $E^0$ is a zero-valent metallic element selected from any of Groups 2-15 of the periodic table and having oxidation state zero; X is any of a binary metalloid hydride, a complex metal hydride, and a complex metalloid hydride; and y is an integral or fractional value greater than zero.

2. The reagent complex of claim 1 wherein the zero-valent metallic element is magnesium, scandium, titanium, vanadium, chromium, molybdenum, iron, cobalt, nickel, copper, silver, gold, zinc, cadmium, boron, indium, antimony, or bismuth.

3. The reagent complex of claim 1 wherein the zero-valent metallic element is a Group 2 element.

4. The reagent complex of claim 1 wherein the zero-valent metallic element is a Group 3 element.

5. The reagent complex of claim 1 wherein the zero-valent metallic element is a Group 4 element.

6. The reagent complex of claim 1 wherein the zero-valent metallic element is a Group 5 element.

7. The reagent complex of claim 1 wherein the zero-valent metallic element is a Group 6 element.

8. The reagent complex of claim 1 wherein the zero-valent metallic element is a Group 7 element.

9. The reagent complex of claim 1 wherein the zero-valent metallic element is a Group 8 element.

10. The reagent complex of claim 1 wherein the zero-valent metallic element is a Group 9 element.

11. The reagent complex of claim 1 wherein the zero-valent metallic element is a Group 10 element.

12. The reagent complex of claim 1 wherein the zero-valent metallic element is a Group 11 element.

13. The reagent complex of claim 1 wherein the zero-valent metallic element is a Group 12 element.

14. The reagent complex of claim 1 wherein the zero-valent metallic element is a Group 13 element.

15. The reagent complex of claim 1 wherein the zero-valent metallic element is a Group 14 element.

16. The reagent complex of claim 1 wherein the zero-valent metallic element is a Group 15 element.

17. A method for synthesizing a reagent complex, comprising:

ball-milling a mixture which includes both a hydride and a preparation containing a zero-valent metallic element; and producing a reagent complex according to a formula:

$$E^0 \cdot X_y$$

wherein $E^0$ is a zero-valent metallic element selected from any of Groups 2-15 of the periodic table and having oxidation state zero; X is any of a binary metalloid hydride, a complex metal hydride, and a complex metalloid hydride; and y is an integral or fractional value greater than zero.

18. The method of claim 17 wherein the zero-valent metallic element is magnesium, scandium, titanium, vanadium, chromium, molybdenum, iron, cobalt, nickel, copper, silver, gold, zinc, cadmium, boron, indium, antimony, or bismuth.

19. The reagent complex of claim 1 wherein X is a borohydride.

20. The method of claim 17 wherein X is a borohydride.

* * * * *